US007878896B2

(12) United States Patent
Jorasch et al.

(10) Patent No.: US 7,878,896 B2
(45) Date of Patent: Feb. 1, 2011

(54) GAMING TOKEN HAVING A VARIABLE VALUE

(75) Inventors: James A. Jorasch, Stamford, CT (US); Magdalena Mik, Greenwich, CT (US); Scott Wolinsky, Danbury, CT (US); William B. Van Vooren, Norwalk, CT (US); Nathaniel Levin, Rye, NY (US); Andrew P. Golden, New York, NY (US)

(73) Assignee: IGT, Reno, NV (US)

( * ) Notice: Subject to any disclaimer, the term of this patent is extended or adjusted under 35 U.S.C. 154(b) by 127 days.

(21) Appl. No.: 11/321,793

(22) Filed: Dec. 29, 2005

(65) Prior Publication Data

US 2006/0217186 A1 Sep. 28, 2006

Related U.S. Application Data

(62) Division of application No. 09/597,801, filed on Jun. 20, 2000, now Pat. No. 7,267,614.

(60) Provisional application No. 60/202,573, filed on May 10, 2000.

(51) Int. Cl.
*A63F 13/00* (2006.01)

(52) U.S. Cl. ............................ 463/20; 463/16; 463/18; 463/25; 273/139; 273/142

(58) Field of Classification Search ................. 345/650, 345/530, 156; 463/31, 16–20, 25; 273/139, 273/142
See application file for complete search history.

(56) References Cited

U.S. PATENT DOCUMENTS

| | | | | |
|---|---|---|---|---|
| 3,906,460 | A | 9/1975 | Halpern | 711/115 |
| 4,185,730 | A | 1/1980 | Roes et al. | 194/210 |
| 4,319,674 | A | 3/1982 | Riggs et al. | 194/210 |
| 4,674,618 | A | 6/1987 | Eglise et al. | 194/210 |
| 4,725,924 | A | 2/1988 | Juan | |
| 4,755,941 | A | 7/1988 | Bacchi | 364/412 |
| 4,758,689 | A | 7/1988 | Nakao et al. | |
| 4,764,666 | A | 8/1988 | Bergeron | 463/25 |
| 4,814,589 | A | 3/1989 | Storch et al. | 235/375 |
| 4,827,640 | A | 5/1989 | Jones | |
| 4,882,473 | A | 11/1989 | Bergeron et al. | 463/25 |
| 4,926,996 | A | 5/1990 | Eglise et al. | |
| 4,968,873 | A | 11/1990 | Dethloff et al. | 235/380 |
| 4,969,549 | A | 11/1990 | Eglise | |
| 4,983,820 | A | 1/1991 | Dias | |
| 4,999,742 | A | 3/1991 | Stampfli | |
| 5,056,141 | A | 10/1991 | Dyke | |

(Continued)

FOREIGN PATENT DOCUMENTS

| | | |
|---|---|---|
| EP | 0057602 | 11/1982 |

(Continued)

OTHER PUBLICATIONS

Hasbro Inc. Trivial Pursuit 10th Anniversary Edition Master Game. 1992 <URL:http://www.hasbro.com/common/instruct/TrivialPursuit(10thanniversaryeditionmastergame).PDF>.*

(Continued)

*Primary Examiner*—Dmitry Suhol
*Assistant Examiner*—Sunit Pandya
(74) *Attorney, Agent, or Firm*—K&L Gates LLP

(57) ABSTRACT

A system installed in a casino allows gambling chips in the casino to have variable values. Each chip has an electronic circuit installed in it to store a chip identifier and data indicative of a value currently associated with the chip. Slot machines and other devices are arranged to interact with the gambling chips to read and write data from and into the chips. A central controller is connected to the slot machines and other devices that interact with the chips. The chips carry a display and/or an audio device to apprise players of the value currently associated with the chip.

14 Claims, 23 Drawing Sheets

U.S. PATENT DOCUMENTS

| | | | | |
|---|---|---|---|---|
| 5,166,502 | A | 11/1992 | Rendleman et al. | 235/492 |
| 5,216,234 | A | 6/1993 | Bell | 235/494 |
| 5,326,104 | A | 7/1994 | Pease et al. | |
| 5,361,885 | A | 11/1994 | Modler | 194/214 |
| 5,399,847 | A | 3/1995 | Druz | |
| 5,406,264 | A | 4/1995 | Plonsky et al. | |
| 5,498,859 | A | 3/1996 | Farmont | |
| 5,505,449 | A | 4/1996 | Eberhardt et al. | |
| 5,569,082 | A | 10/1996 | Kaye | |
| 5,588,649 | A | 12/1996 | Blumberg et al. | 463/18 |
| 5,607,156 | A | 3/1997 | Samarasinghe | 273/146 |
| 5,619,066 | A | 4/1997 | Curry et al. | |
| 5,651,548 | A | 7/1997 | French et al. | 273/309 |
| 5,667,218 | A | 9/1997 | Kumabe et al. | 273/138.3 |
| 5,676,376 | A | 10/1997 | Valley | 273/288 |
| 5,706,925 | A | 1/1998 | Orus et al. | 194/214 |
| 5,709,603 | A | 1/1998 | Kaye | |
| 5,735,742 | A | 4/1998 | French | 463/25 |
| 5,764,789 | A | 6/1998 | Pare, Jr. et al. | |
| 5,770,533 | A | 6/1998 | Franchi | 463/42 |
| 5,781,647 | A | 7/1998 | Fishbine et al. | 382/1 |
| 5,855,515 | A | 1/1999 | Pease et al. | |
| 5,892,210 | A | 4/1999 | Levasseur | |
| 5,895,321 | A | 4/1999 | Gassies et al. | 463/29 |
| 5,902,983 | A | 5/1999 | Crevelt et al. | |
| 5,919,090 | A | 7/1999 | Mothwurf | 463/25 |
| 5,967,516 | A | 10/1999 | Phillips | 273/138.2 |
| 5,969,633 | A | 10/1999 | Rosler | 340/825.34 |
| 6,003,651 | A | 12/1999 | Waller et al. | |
| 6,021,949 | A | 2/2000 | Boiron | |
| 6,032,955 | A | 3/2000 | Luciano et al. | |
| 6,048,269 | A | 4/2000 | Burns et al. | |
| 6,050,487 | A | 4/2000 | Bonifas et al. | 235/375 |
| 6,050,895 | A | 4/2000 | Luciano, Jr. et al. | |
| 6,062,981 | A | 5/2000 | Luciano, Jr. | |
| 6,099,408 | A | 8/2000 | Schneier et al. | |
| 6,109,530 | A | 8/2000 | Larson et al. | |
| 6,110,042 | A | 8/2000 | Walker et al. | 463/25 |
| 6,138,106 | A | 10/2000 | Walker et al. | 705/14 |
| 6,148,094 | A | 11/2000 | Kinsella | |
| 6,186,895 | B1 | 2/2001 | Oliver | |
| 6,193,153 | B1 | 2/2001 | Lambert | |
| 6,200,218 | B1 | 3/2001 | Lindsay | |
| 6,257,979 | B1 * | 7/2001 | Walker et al. | 463/13 |
| 6,264,109 | B1 | 7/2001 | Chapet et al. | 235/492 |
| 6,270,410 | B1 | 8/2001 | DeMar et al. | |
| 6,296,190 | B1 | 10/2001 | Rendleman | |
| 6,330,162 | B2 | 12/2001 | Sakamoto et al. | |
| 6,357,746 | B1 | 3/2002 | Sadowski | |
| 6,454,651 | B1 * | 9/2002 | Yoseloff | 463/25 |
| 6,575,832 | B1 | 6/2003 | Manfredi et al. | 463/25 |
| 6,629,591 | B1 | 10/2003 | Griswold et al. | 194/205 |
| 2005/0026674 | A1 * | 2/2005 | Wolf et al. | 463/16 |

FOREIGN PATENT DOCUMENTS

| | | |
|---|---|---|
| EP | 0360613 A2 | 3/1990 |
| WO | 96/03712 | 2/1996 |
| WO | 96/17329 | 6/1996 |
| WO | WO 98/35309 | 8/1998 |
| WO | WO 99/19027 | 4/1999 |

OTHER PUBLICATIONS

Hasbro Inc. Trivial Pursuit 10th Anniversary Edition Master Game. 1992. <URL: http://www.hasbro.com/common/instruct/TrivialPursuit(10thanniversaryeditionmas tergame).PDF>.*

Thomas Lucas M. Ninja Gaiden II: The Dark Sword of Chaos Review. 1990. <URL: http://wii.ign.com/articles/827/827325p1.html>.*

Orwall, Bruce, "Playing Slots? Casinos know you" The Orange Cunty Register, Dec. 26, 1995; Morning Edition, Section: Business; p. C01.

Friedman, Lisa, "Getting their ducks in a row", International Gaming and Wagering Business, Aug. 1996, Section: p. S10; ISSN: 8750-8222.

Taylor Parets, Robyn, "The Newer IDEAL", International Gaming and Wagering Business, Apr. 1997, Section: p. 27; ISSN: 8750-8222.

Woods, Adam, "Woolworths play a new Tune with Loyalty Stickers", Precision Marketing, News Section, p. 3, Jul. 14, 1997.

White Dale, "Bradenton Merchants Unite To Help Build Downtown", Sarasota Herald-Tribune, Local/State Section, p. 1B, Mar. 4, 1998.

Young, Virginia, "Bill Is Approved That Would Exempt Children's Arcades From Gaming Laws; Kids Couldn't Win More Than They Paid to Play", St. Louis Post-Dispatch, News Section; p. A1 May 17, 1999.

"ERG", AAP Newsfeed, Nationwide General News Section, Finance Wire Section, May 27, 1999.

Tapscott, Don, "Reaching the Internet Generation", Credit Union Executive, No. 1, vol. 40, p. 24, ISSN: 0011-1058, Jan. 1, 2000.

Guernsey, Lisa, "Scanners You Can Take To The Library", The New York Times, Section G, p. 13, col. 1, Circuits, Jan. 20, 2000.

"New Bus Service to Metrolink Hub Set", The Press-Enterprise, Local Section, p. B03, Jan. 25, 2000.

Arave, Lynn, "S.L. Loses Controversial Talk Show", The Deseret News, Weekend Section, p. W05, Feb. 4, 2000.

Jones, Tricia, "Eye Spy: Coupon Booklet Caters to Pets", The Columbian (Vancouver, WA), Life Section, p. e1, Feb. 9, 2000.

McCabe, Diane, "Where's the Jingle? Fans of Plastic want to Cash in on Smart-Card Technology, although most consumers see little or no reason to break their nickel-and-dime ways", The San Diego Union Tribune, Business Section, p. 1-3, Mar. 5, 2000.

Lubinger, Bill, "Gateway Hilton Planned for 2001", The Plain Dealer, Business Section, p. 1H, Apr. 9, 2000.

Lawrence, Bob, "eBet expands further with purchase of Netcash_2", AAP Newsfeed, Nationwide General News Section, Finance Wire Section, Apr. 10, 2000.

"What is Mondex?", [retrieved on Apr. 26, 2000], Retrieved from the Internet: <http://www mondex com/mondex/cgi-bin>.

"How to Use MetroCard", New York City Transit Online, [retrieved on Apr. 26, 2000].

"About MetroCard & Transit Information", [online], [retrieved on Apr. 26, 2000], <MetroCard.Citysearch.com>.

"AT&T Prepaid Phone Card, It's all within your reach.", [online], [rerieved on Jun. 12, 2000], Retrieved from the Internet: <http://www att com/prepaidcard>.

Definition of Lottery from the Encyclopedia Britannica.

U.S. Office Action dated Nov. 7, 2001, U.S. Appl. No. 09/597,801, Filing Date Jun. 20, 2000 to Jorasch et al., 13 pages.

U.S. Office Action dated Sep. 25, 2002, U.S. Appl. No. 09/597,801, Filing Date Jun. 20, 2000 to Jorasch et al., 6 pages.

U.S. Office Action dated Jan. 2, 2003, U.S. Appl. No. 09/597,801, Filing Date Jun. 20, 2000 to Jorasch et al., 6 pages.

U.S. Office Action dated Aug. 5, 2003, U.S. Appl. No. 09/597,801, Filing Date Jun. 20, 2000 to Jorasch et al., 8 pages.

U.S. Office Action dated Apr. 6, 2004, U.S. Appl. No. 09/597,801, Filing Date Jun. 20, 2000 to Jorasch et al., 13 pages.

U.S. Office Action dated Jan. 13, 2005, U.S. Appl. No. 09/597,801, Filing Date Jun. 20, 2000 to Jorasch et al., 12 pages.

Appeal Brief dated Nov. 21, 2005, U.S. Appl. No. 09/597,801, Filing Date Jun. 20, 2000, 65 pgs.

U.S. Notice of Allowance and Fees Due dated Jun. 4, 2007, U.S. Appl. No. 09/597,801, Filing Date Jun. 20, 2000 to Jorasch et al., 9 pgs.

* cited by examiner

800

| TOKEN IDENTIFIER 802 | VALUE NUMBER 804 |
|---|---|
| 34892 | 1 |
| 76239 | 2 |
| 11467 | 1 |

FIG. 8

900

| VALUE NUMBER 902 | ASSOCIATED VALUE 904 |
|---|---|
| 1 | = $5 |
| 2 | = $7 |
| 3 | = FACE VALUE + $3 |
| 4 | = $(30 - 0.2 * T) WHERE T IS MINUTES AFTER EVENT, SO LONG AS $(30 - 0.2 * T) > $25, ELSE $25 |

FIG. 9

950

| TOKEN IDENTIFIER 952 | STATUS 954 | ASSOCIATED BENEFIT 956 |
|---|---|---|
| 45970 | BRONZE | ELIGIBLE FOR PLAYING 'BRONZE' SLOT MACHINE |
| 63212 | GOLD | 25% OFF ITEMS IN GIFT SHOP |
| 75289 | PLATINUM | WORTH DOUBLE FACE VALUE |
| 37468 | SILVER | 50% OFF ADMISSION TO ANY SHOW |

FIG. 9A

1000

| EVENT 1002 | VALUE NUMBER 1004 |
|---|---|
| A TOKEN IS INSERTED INTO A SLOT MACHINE 1006 | 1 |
| PULLING A SLOT MACHINE HANDLE 1000 TIMES IN A TWO HOUR SPAN 1008 | 3 |
| PLAYING BLACKJACK FOR AN HOUR 1010 | 2 |
| A PLAYER HAS ENTERED THE HIGH STAKES POKER ROOM 1012 | 4 |
| THE TOKEN HAS BEEN DISCHARGED FROM A SLOT MACHINE 1014 | 2 |

FIG. 10

GAMING TOKEN HAVING A VARIABLE VALUE

CROSS-REFERENCE TO RELATED APPLICATION

This application is a divisional of U.S. patent application Ser. No. 09/597,801, entitled "GAMING TOKEN HAVING A VARIABLE VALUE" in the name of Walker et al., which was filed Jun. 20, 2000 and which issued as U.S. Pat. No. 7,267,614 on Sep. 11, 2007; and which application claims the benefit of priority of U.S. Provisional Patent Application Ser. No. 60/202,573, filed May 10, 2000.

The present application is also related to:

(i) U.S. patent application Ser. No. 11/838,551, filed Aug. 14, 2007 in the name of Walker et al., entitled "GAMING TOKEN HAVING A VARIABLE VALUE";

(ii) U.S. patent application Ser. No. 11/329,872 filed Jan. 11, 2006 in the name of Walker et al., entitled "GAMING TOKEN HAVING A VARIABLE VALUE";

(iii) U.S. patent application Ser. No. 11/331,550 filed Jan. 13, 2006 in the name of Walker et al., entitled "GAMING TOKEN HAVING A VARIABLE VALUE", and (iv) U.S. patent application Ser. No. 11/361,152 filed Feb. 24, 2006 in the name of Walker et al., entitled "GAMING TOKEN HAVING A VARIABLE VALUE".

FIELD

The present invention relates to equipment used in gaming casinos, and is also concerned with betting chips and tokens employed in casinos.

BACKGROUND

The profitability of a casino is directly related to such factors as the statistical house advantage provided by games offered by the casino, and the amount of money wagered by players. In general, profits are increased in casinos by increasing the amount of money wagered. It is therefore in the interest of casinos to attract as many players as possible, and to encourage them to continue playing as long as possible and to wager as much as possible.

One technique used by casinos to attract and retain players is the granting complimentaries or "comps". Comps are benefits such as free or discounted food, lodging, entertainment or transportation given to players in recognition of amounts wagered and/or periods of time spent playing.

U.S. Pat. No. 5,967,896, entitled "Method and Apparatus for Controlling a Gaming Device Having a Plurality of Balances," and commonly assigned with this application, discloses a slot machine that employs multiple credit meters so that players are given incentives to pay relatively large credit balances into the slot machine instead of merely inserting enough of a payment for the next play cycle.

It would be desirable to add new features to existing games to provide incentives for further play. It would also be desirable to add features that enhance the interest and entertainment value of existing games.

SUMMARY OF THE INVENTION

An aspect of the invention provides a method of changing a value of a gaming token, where the method includes associating a first non-zero value with a gaming token, detecting an event, and, in response to detection of the event, associating a second non-zero value with the gaming token, the second non-zero value being different from the first non-zero value.

The gaming token may include a memory, in which case the associating steps may respectively include storing the first and second values in the memory. Alternatively, the associating steps may respectively include storing the first and second values in a database entry that corresponds to the gaming token.

The detected event may be insertion of the gaming token in a gaming device such as a slot machine. The detected event may, alternatively, be discharging of the gaming token from a gaming device. As an alternative, the detected event may be a period of time that a player has played a gaming device, or a number of times that a player has played a gaming device. As still another alternative, the detected event may be placing the gaming token in proximity to a value-changing device, such as a read/write device that may be actuated by a dealer to change the value of the gaming token. Such a device may include a mechanism for changing a magnetic state of a component of the gaming token.

According to a further aspect of the invention, the value associated from time to time with the gaming token may be displayed, for example, by a display device mounted on the gaming token.

According to another aspect of the invention, a gaming token includes a token body, and a display device mounted in the token body and being switchable between a first display status and a second display status different from the first display status. The display device may be arranged to display a first color in the first display status and a second color, different from the first color, in the second display status. Alternatively, the display device may be blank in the first status and may display an alphanumeric readout in the second display status. As still another alternative, the display device may display a first alphanumeric readout in the first display status and a second alphanumeric readout, different from the first readout, in the second display status. The display device may include a light-emitting diode or a liquid crystal display. One purpose of the display device is to display to a person the currently applicable value of the token.

According to yet another embodiment of the invention, a gaming token includes a token body, and a sound emitting device, mounted in the token body, for emitting at least one sound indicative of a status of the gaming token.

According to a further aspect of the invention, a method of using a gaming token includes providing a gaming token that includes a memory and a display device, storing in the memory value data indicative of a value of a gaming token, and displaying information on the display device, where the displayed information represents the value data stored in the memory. The method according to this aspect of the invention may also include detecting an event, updating the value data stored in the memory in response to detection of the event, and displaying on the display device updated information that represents the updated value data. Still further, the method may include redeeming the gaming token, and, in response to redemption of the gaming token, updating the value data stored in the memory. The redeeming step may include inserting the gaming token into a gaming device, such as a slot machine.

According to yet another aspect of the invention, a method of redeeming a gaming token includes providing a gaming token that includes a memory, storing in the memory value data indicative of a value of the gaming token, inserting the gaming token into a gaming device, and in response to insertion of the gaming token into the gaming device, updating the value data stored in the memory.

Yet another aspect of the invention provides a memory device storing a database, the database including a plurality of entries, each entry including a first field for storing a token identifier that identifies a particular gaming token, and a second field for storing value data that represents a value associated with the gaming token identified by the token identifier stored in the first field.

In accordance with still a further aspect of the invention, a method of administering a game of chance includes inserting a gaming token into a gaming device, and after the inserting step reading from the gaming token a token identifier. Further steps of this method include determining on the basis of the read token identifier whether a prize has been won, and displaying a result of the determining step. The reading step may include receiving a signal transmitted from the gaming token or optically scanning the gaming token. The determination as to whether a prize has been won may be based on two or more token identifiers read from two or more gaming tokens that have been inserted in the gaming device.

Still another aspect of the invention provides a gaming device, which includes structure for receiving a gaming token, and circuitry for reading a token identifier from a gaming token that has been received by the token-receiving structure. The gaming device according to this aspect of the invention may also include communication circuitry for exchanging data signals from a host computer, and determining circuitry, connected to the reading circuitry and the communication circuitry, for determining whether a prize has been won, and also including a display responsive to the determining circuitry, for displaying an indication that a prize has been won.

According to still another aspect of the invention, a method of administering a game includes providing a gaming token that includes a display, using the display to display information, and determining a game outcome on the basis of the displayed information. The displayed information may be alphanumeric information, and the game may be bingo or a drawing.

According to still a further aspect of the invention, a method of operating a game device includes receiving a payment from a player, generating a credit corresponding to the received payment, representing the credit as a displayed set of at least one virtual token, associating a use number with each virtual token, identifying at least one virtual token for betting, determining a play outcome, and, on the basis of the play outcome, updating the displayed set of at least one virtual token. The receiving step may include receiving currency and/or tokens inserted in the game device or receiving a transfer from a payment card such as a credit card. The play outcome may be a result of spinning slot machine reels or virtual slot machine reels or by a result of generating a random number which is used to determine a position of reels or virtual reels. The updating step may include adding at least one virtual token and incrementing the use number associated with the identified virtual token, if the play outcome indicates a win. The updating step may include removing the identified virtual token if the play outcome indicates a loss.

The use number associated with a virtual token that has not been identified for betting may be zero, and the use number associated with a virtual token may be equal to a number of times the virtual token has been identified for betting without being lost. A benefit may be provided to the player for each virtual token having a use number equal to a predetermined threshold. The benefit may be, for example, provision of one or more additional virtual tokens.

With the methods and devices provided in accordance with the invention, secondary games may be implemented to add interest to existing slot machines and other gaming devices. Moreover, tokens may be provided that are capable of supporting multiple statuses, with preferred statuses giving rise to benefits for the player. Consequently, players are given an incentive to continue playing to obtain special-status tokens and the entertainment value of existing gaming devices is enhanced. Tokens provided in accordance with the invention include display and/or sound-emitting devices so that the token can display and/or announce its status to the player.

BRIEF DESCRIPTION OF THE DRAWINGS

FIG. 8 is a tabular representation of a token database stored in the central controller of FIG. 6;

FIG. 9 is a tabular representation of a value database stored in the central controller;

FIG. 9A is a tabular representation of a token status database that may be stored in the central controller in addition to or instead of the databases shown in FIG. 6.

FIG. 10 is a tabular representation of an event database stored in the central controller;

DETAILED DESCRIPTION

The following definitions shall apply in this specification and in the appended claims.

"alphanumeric": including letters or numerals, or both letters and numerals.

"client device": includes a personal computer, portable computer, palm top device, cellular telephone, personal digital assistant or any other device programmed with a browser program or other program to interact as a client relative to a host computer.

"gaming device": includes slot machines, video poker machines, and other machines, devices or combinations or networks of devices used to play games of chance.

"gaming token": includes a casino chip or other object issued by a casino for betting in a table game of chance or in a gaming device, or a token issued by a game arcade for use in a video game or other amusement game.

"payment card": includes a credit card, a debit card, or a value card.

"reel": may include either an actual mechanical reel of a slot machine or a field in a video display representative of a slot machine reel.

"slot machine": may include a slot machine having mechanical reels controlled by a processing device, a video slot machine, a computer programmed to simulate a slot machine, and a web server that interacts with a client device to display a slot machine simulation on the client device.

Figure 1:
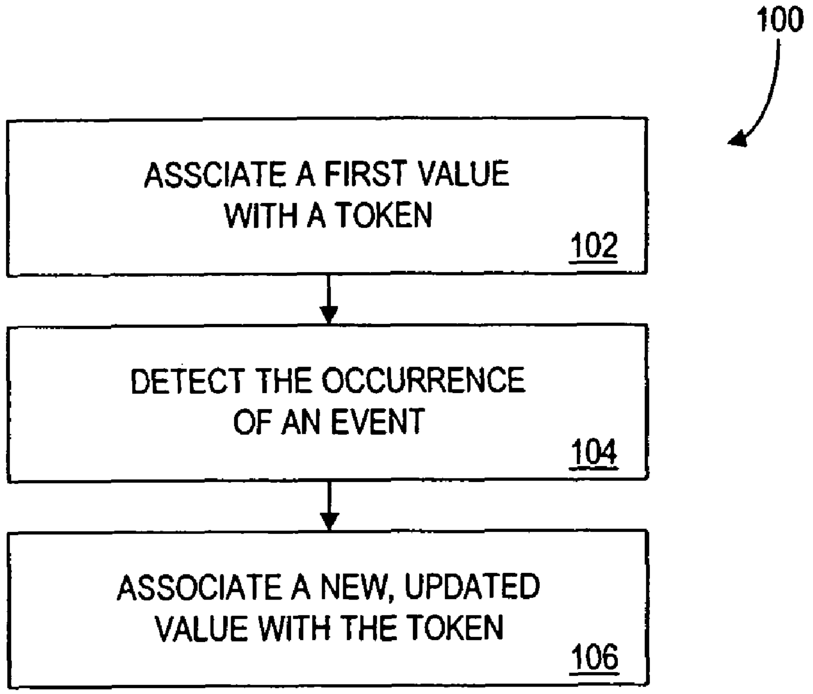
FIG. 1 is a flowchart that provides an overview of a method of using a gaming token provided in accordance with an aspect of the invention.

FIG. 1 is a flowchart that provides an overview illustration of a method 100 provided in accordance with the present invention. According to a first step 102 in FIG. 1, a value is associated with a gaming token. This value may be, for example, the face value of the token. If the token is provided with a memory, as in certain embodiments of the invention, then the association of the value with the token may be performed by storing the value in the memory. As another alternative, a database, to be discussed below, may be maintained for all of the tokens in the casino. For this purpose, a unique token identifier may be associated with each token. Such an identifier may be stored in a machine-readable memory installed in the token and/or may be printed or otherwise marked on the token. By using such a unique token identifier, the database may have an entry for each token, including a field corresponding to the token identifier and another field that indicates a value currently associated with the token.

Following step 102 is step 104. At step 104 an event occurs which, as will be seen, is to have an effect upon the value of the token. Such an event may take many forms, as will be described below. To give just a few examples, the event of step 104 may involve interaction between a gaming token and a gaming device. Such an interaction may include the token being inserted in the gaming device. Another event may be the token being discharged or paid out from the gaming device. Other events may be related to a player who has the token in his or her possession or may soon come into possession of the token. Such events may include a period of time that the player has played a particular table game or gaming device (e.g., the player has played at a particular blackjack table for an hour, or has played a particular slot machine for 45 minutes); or an event may be deemed to have occurred upon a player playing a particular game a certain number of times (e.g., the player has played 30 play cycles of a slot machine or 40 hands of blackjack). As another alternative, events may simply be the expiration of a pre-determined period of time or the occurrence of a pre-determined point in time. As still another alternative, an event may be initiated by a casino employee, for example, the casino employee may bring a token into proximity with a device, to be discussed below, which allows the value of the token to be adjusted.

Step 106 follows step 104. At step 106 a new, updated value is associated with the token. From previous discussion it will be understood that the new value may be stored in a memory provided in the token, or the new value may be stored in a token database, and more particularly in a database entry that corresponds to the token.

The present invention, by providing a token with a varying value, or a token that in some other way changes in status from time to time, makes it possible to add additional playable aspects to existing games and to provide incentives for players to continue playing games, and allows for enhancements in the entertainment value of casino games.

More detailed descriptions of embodiments of the invention will now be provided.

Figure 2:
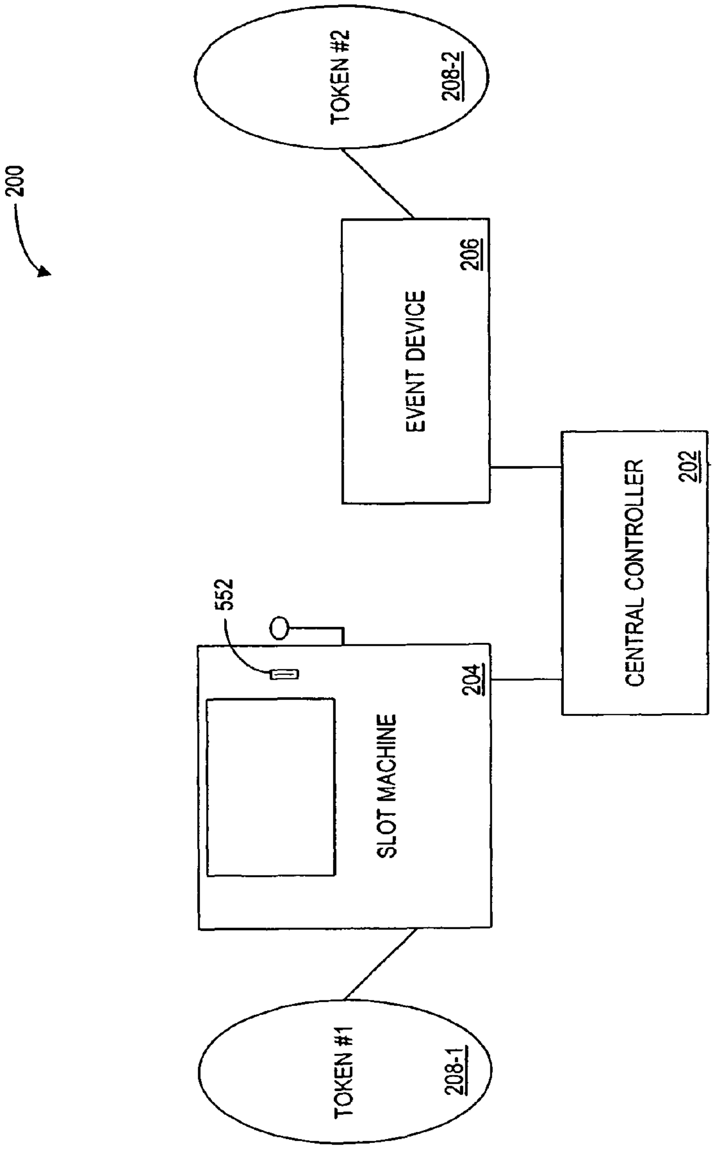
FIG. 2 is a schematic block diagram of a system of devices provided in accordance with the invention.

FIG. 2 is a simplified block diagram of a system that may be installed in a casino to implement one or more embodiments of the invention. In FIG. 2, reference numeral 200 generally indicates the system of the invention. Included in the system 200 is a central controller 202. The central controller 202 may be made up of multiple controllers.

The system 200 also includes a slot machine 204 and an event device 206, both connected for data communication with the central controller 202. Although only one slot machine is explicitly shown in FIG. 2, it is contemplated to include a large number of slot machines in the system 200 and connected to the central controller 202. Similarly, although only one event device is shown in FIG. 2, it is contemplated that a large number of event devices may be included in the system 200.

The slot machine 204 may include all of the hardware and software features of a conventional networkable slot machine. Details of the slot machine 204 will be discussed below. In addition, the slot machine 204 may include software and hardware features added in accordance with the invention to implement detection of events and to perform changes in value and/or status of gaming tokens that interact with the slot machine. An event device may also be a component of a slot machine.

The event device 206 may be an item provided in accordance with the invention. Details of the event device will be discussed below. From subsequent discussion it will be understood that slot machines may also function as event devices. The purpose of an event device is to detect events and to communicate with gaming tokens to cause the gaming tokens to undergo changes in value or status as a result of the detected events. An event device may also be a component of a slot machine.

Also shown in FIG. 2 are tokens 208-1 and 208-2, respectively interacting with the slot machine 204 and the event device 206. Features of the tokens 208 will be discussed below. Although only two tokens 208 are shown in FIG. 2, it is contemplated that a very large number of tokens may be included in the system 200, perhaps on the order of tens of thousands, or hundreds of thousands, or even a million or more tokens in a large casino. It is also contemplated to employ more than one type of token in a casino. For example, relatively large denomination tokens may be provided with the data storage, processing, token identification and/or display features to be described below, whereas some or all of these features may be omitted from low denomination tokens.

Figure 3:
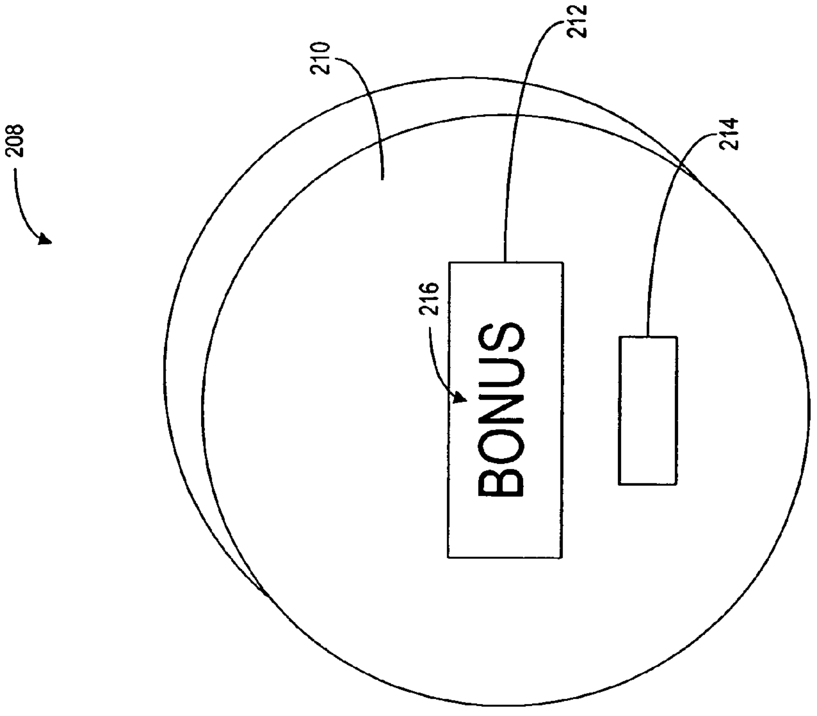
FIG. 3 is a schematic perspective view of a gaming token provided in accordance with the invention.

FIG. 3 is a schematic perspective view of one of the tokens 208. The token includes a body 210 which may be formed of molded plastic, clay, metal or the like. Mounted in the body 210 is a display 212. Housed within the body 210 and not shown in FIG. 3, are electronics for driving the display 212 and for performing other functions of the token 208. Also mounted in the token body 210 is an audio device 214 which provides an audio output to indicate the status of the token 208. Also to be noted in FIG. 3 is information 216 visually displayed by the display 212 to indicate the status and/or value of the token 208.

The display 212 may take many forms, including a liquid crystal display (LCD) and/or a light-emitting diode (LED). The display 212 may be segmented to display letters and/or numerals. The display 212 may be arranged to change colors, say from brown or bronze to gold, to indicate a change in status or an increased or decreased value of the token 208.

The audio device 214 may be a simple miniature audio transducer such as the Panasonic model EAF-8RM08EF. The audio device 214 may be driven to generate various coded beep sequences to indicate respective statuses and/or values of the token 208. Alternatively, the audio device 214 may be driven to beep intermittently or on occasion to indicate one value or status of the token 208, and may be maintained in silence to indicate another value or status. The display 212 and the audio device 214 may be driven in combination to indicate statuses and/or values of the token 208.

Figure 4:
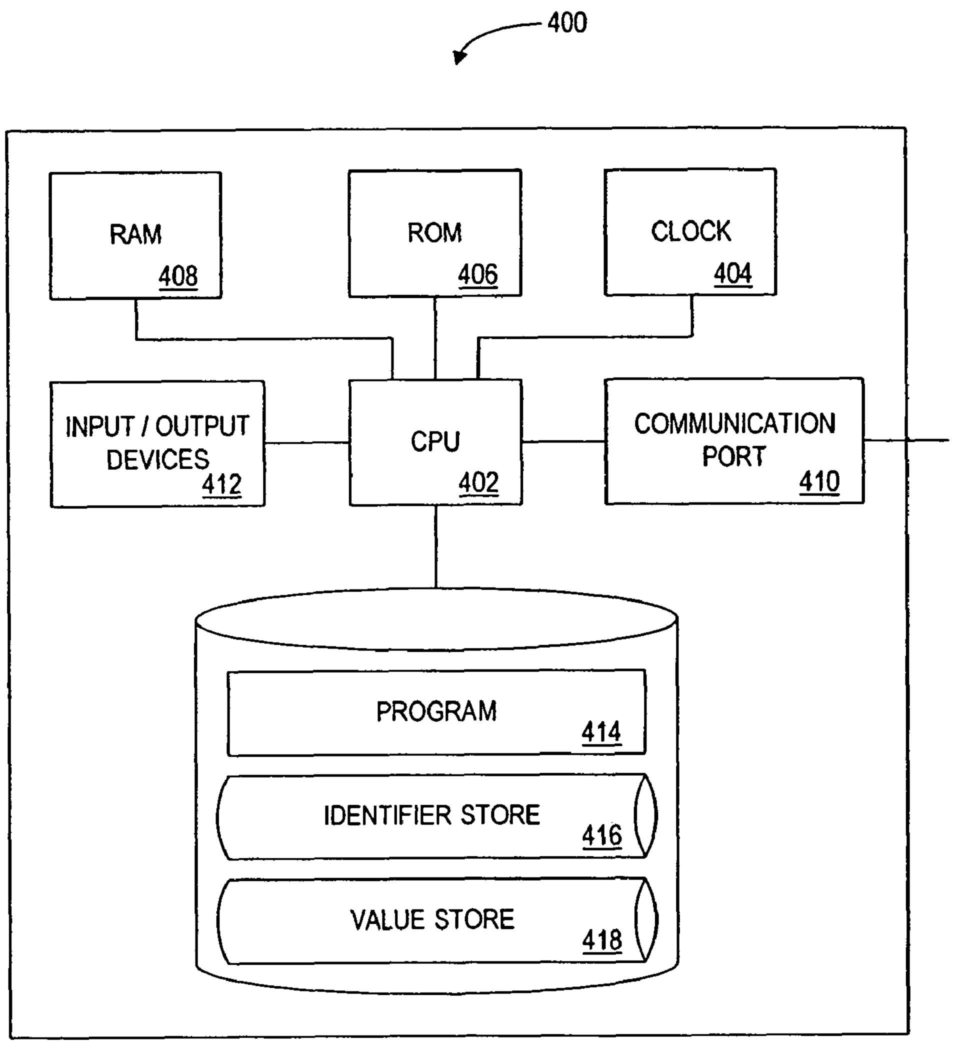
FIG. 4 is a block diagram showing electronic components of the gaming token of FIG. 3.

FIG. 4 is a block diagram of electronic components 400 of the token 208. The electronic components include a processor 402 which is connected to a clock 404, Read Only Memory (ROM) 406 and Random Access Memory (RAM) 408. The processor performs functions normally carried out by a programmable CPU in a microprocessor-based system. The clock 404 controls the timing of program execution cycles of the processor 402. The ROM 406 and RAM 408 together provide working memory space and program storage for the processor 402. Connected to the processor 402 is a communication port 410, by means of which processor 402 is enabled to engage in data communication with external devices.

Although the electronic components 402-410 may be embodied as discrete components mounted on a suitably sized circuit board, it may be desirable in the interest of miniaturization to implement these components by means of one or more application specific integrated circuits (ASICs). As another alternative, many or all of the components 402-410 may be implemented by means of hardware used in conventional miniature transponders of the types used for article identification applications such as RFID (radio frequency identification) applications.

Also connected to the processor 402 are input and/or output devices 412, which may include the display 212 and the audio device 214 referred to above. It is to be noted that either or both of the display 212 and the audio device 214 may be omitted from the token 208, and indeed the token 208 may be totally without input/output devices other than the communication port 410. Furthermore, the input/output 412 may include one or more pressure sensitive devices whereby a player, by squeezing or tapping the token or the like, may provide input signals to the processor 402.

FIG. 4 also shows a program 414 that controls the processor 402 and may be stored in one or both of the ROM 406 and the RAM 408. Also shown are data storage facility 416 for storing a token identifier that uniquely identifies the token 208, and data storage facility 418 for storing data indicative of a currently applicable value or status of the token 208.

Not explicitly shown in FIG. 4 is a power source such as a battery which provides power for the processor 402 and other components of the token 208, and which may also back up the RAM 408. The identifier storage facility 416 may be maintained in either the ROM 406 or the RAM 408, but the value storage 418 is preferably in the RAM 408 or in another memory device which is re-writable but permanent.

The present invention also contemplates variable-value gaming tokens that have a considerably simpler construction than that illustrated in FIGS. 3 and 4. For example, the token identifier and storage therefore may be eliminated. Moreover, the token may store its value in a simple "one-bit" arrangement such as a magnetic element that is placed in one magnetic state to indicate a first value and is placed in another magnetic state to indicate a second value. A simple display to indicate the magnetic state of the magnetic element may also be provided.

The present invention contemplates providing gaming tokens that store a currently associated value and/or a token identifier but do not include either a display device or an audio device. In such cases, one or more other components of the system are arranged to read the currently associated value and/or the token identifier and to display the information read from the token or corresponding information retrieved from the central controller.

Figure 5:
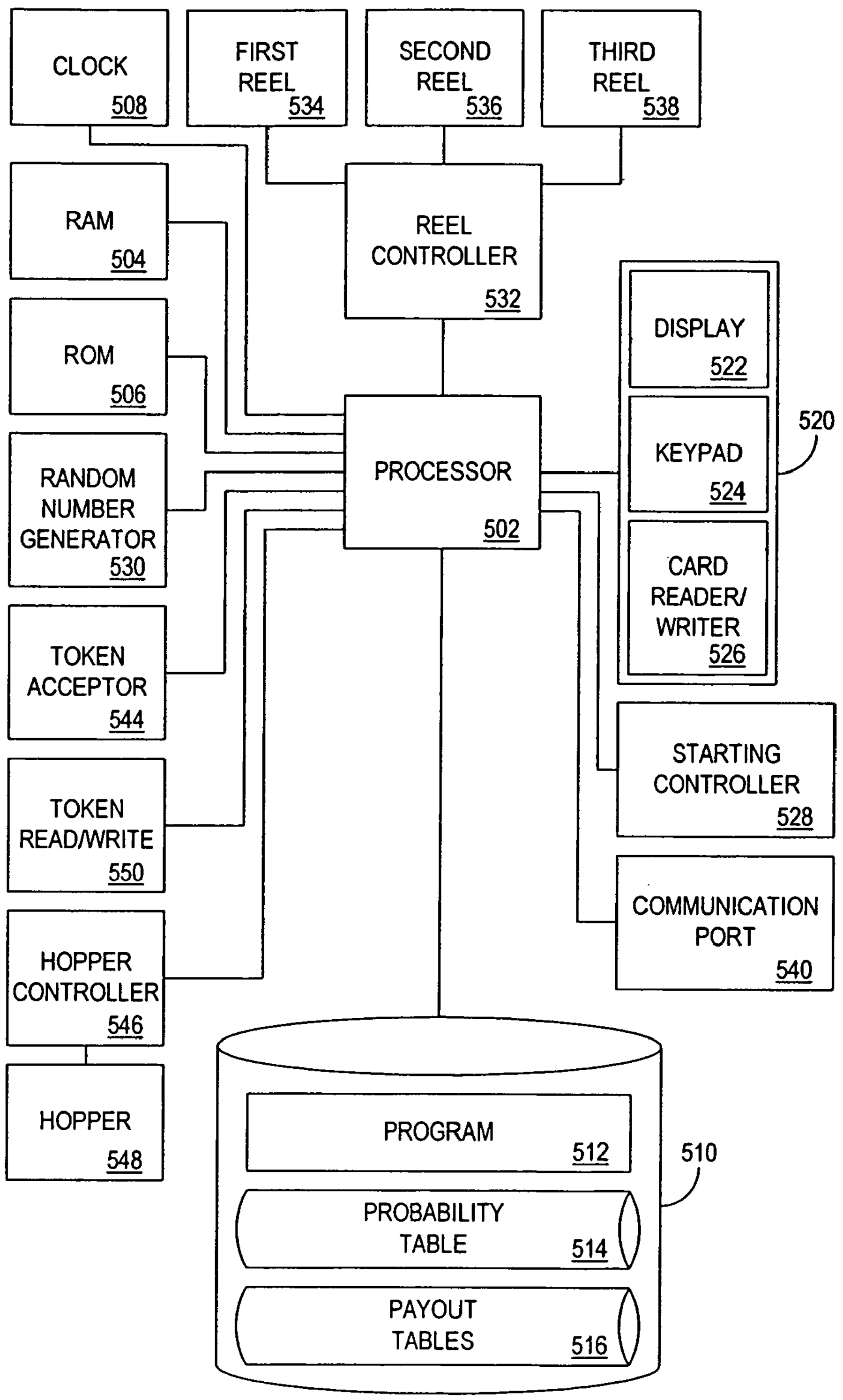
FIG. 5 is a block diagram illustration of a slot machine provided in accordance with the invention and included in the system of FIG. 2.

FIG. 5 is a block diagram representation of a slot machine provided in accordance with at least one embodiment of the invention. Slot machine 204 may be a conventional slot machine modified in accordance with the invention. The slot machine 204 includes known hardware components, such as a processor 502 which may be any commonly available microprocessing chip such as the microprocessors manufactured by Intel, and marketed under the trademark "Pentium". Processor 502 is shown in communication with each of a data storage device 510, a Read Only Memory (ROM) 506, a Random Access Memory (RAM) 504, a clock 508 and a communications port 540. Processor 502 can be in communication with the data storage device 510, the ROM 506, the RAM 504, the clock 508 and the communications port 540, either by means of a shared data bus or by dedicated connections, as is well known in the art. Furthermore, processor 502 may be embodied as a single processor or a number of processors.

Processor 502 runs at a clock speed determined by clock 508. Clock 508 sends timing signals to processor 502 for controlling the processor speed and for synchronizing data and processing instructions among the components of slot machine 204. Clock 508 may further be used to measure the passage of time.

RAM 504 and ROM 506 may be standard memory components that operate in a conventional manner.

The data storage device 510 and/or ROM 506 are operable to store one or more instructions and data, which the processor 502 is operable to retrieve, interpret and execute. The data storage device 510 may be, for example, any one of the following, a hard drive, a floppy disk drive, a DVD drive, a ZIP drive, or a tape drive. Data storage device 510 is operative to store a program 512, a probability table 514, and a payout table 516. In accordance with a preferred embodiment of the present invention, the program 512 contains processing instructions for directing processor 502 to retrieve and perform process steps as are described below. Data storage device 510 is preferably also operative to store an operating system for operating the processor 502 as will be apparent to one of ordinary skill in the art.

Communications port 540 may be any input/output port commonly used for computer communications, such as a modem or other data transfer device. The communications port 540 connects the slot machine 204 for communication with the central controller 202 referred to above. It is also contemplated that the slot machine 204 may be in communication with other devices via the communications port 540. Among other functions, the communications port 540, under the control of the processor 502, may transmit data such as player tracking information received through the card reader/writer 526, discussed below. The communications port 540 may also receive and/or transmit data relevant to detection, or updating of the status and/or value of tokens 208 that interact with the slot machine 204. The communications port 540 may include multiple communication channels for simultaneous connections with a plurality of external devices.

Processor 502 is further operatively connected to hopper controller 546. Hopper controller 546 controls the dispensing of tokens and/or currency by slot machine 204 to hopper 548. The hopper controller 546 is connected to the hopper 548 for the purpose of dispensing tokens and/or coins. For example, a player can cash out credits to receive tokens in a conventional manner by pushing a cash out button (not shown) on the slot machine 204. The processor 502 then checks data stored in RAM 504 or data storage device 510 to determine if the player has any available credits and, if so, signals the hopper controller 546 to release an appropriate number of coins and/or tokens into a hopper 548, where the coins and/or tokens may be collected by the player.

Processor 502 is further operatively connected to token and currency acceptor 544. A player may deposit gaming tokens and/or currency (coins and/or bills) with the slot machine 204 via the token acceptor 544 (which also may include a paper currency receiving and validating device). It is also contemplated that the slot machine 204 may be equipped to receive payment in electronic form from a payment card such as a credit card, debit card, or value card. In any event, the token acceptor 544 determines the number of tokens or currency deposited and transmits such information to processor 502 which stores credit information in an appropriate register (not shown) in RAM 504 and/or data storage device 510.

Processor 502 is preferably in communication with a starting controller 528. The starting controller 528 is an input device, such as a button, handle, touch-screen or other known input device, and is used by the player to initiate a play cycle of the slot machine 204.

A player tracking device 520 is also in communication with the processor 502. The player tracking device 520 includes a card reader/writer 526 for reading player identification information stored on a player tracking card (not shown), which is preferably encoded with information to identify the player, in a known manner. The player tracking device 520 also preferably includes a display 522, having an associated player interface, such as a numeric keypad 524 for entry of player information. The player tracking device 520 may be embodied, for example, as the Mastercom device, commercially available from Bally Manufacturing. Tracking individual players may be useful in rewarding players for participating in or causing particular events and/or in motivating players to participate in or cause such events.

Processor 502 is further operatively connected to a random number generator 530 and a reel controller 532. Random number generator 530 may be an electronic pseudo-random number generator, as known to those who are skilled in the art, which determines a random number from a random electrical event or combination of events. The reel controller 532 is an electromechanical device, likewise known to those who are skilled in the art, which controls, monitors and records the position of slot reels 534, 536 and 538.

As noted above, a player may initiate a play cycle on the slot machine 204 by actuating starting controller 528. Thereafter, processor 502 initiates the random number generator 530 to generate a random number and transmit such number to processor 502. The processor 502 looks up the generated random number in an appropriate field of the probability table 514, and retrieves the corresponding reel combination, or an individual game result. The processor 502 then directs the reel controller 532 to spin reels 534, 536 and 538 and to stop at a point when a combination of symbols corresponding to the retrieved individual game result is displayed. The processor 502 then consults payout tables 516 to determine what, if any, payout is due in respect of the game results. If a payout is due, then a corresponding credit is added to whatever credits are already stored for the player in the slot machine 204. The processes described in this paragraph are such as are conventionally performed in slot machines.

The slot machine 204 also includes token read/write devices 550 which are connected to the processor 502. The token read/write devices 550 are provided for the purpose of communicating with intelligent tokens of the type described in connection with FIGS. 3 and 4. The token read/write devices 550 may be devices of the type used to communicate with article identification and tracking transponders, and may be placed at the token intake 552 (FIG. 2) and/or at the hopper 548. As will be seen, the token read/write devices 550 may operate to detect the presence of a token, and thereby detect an event such as insertion of a token into the slot machine 204 and/or discharging of a token from the slot machine 204. The token read/write devices 550 may cooperate with the token acceptor 544 and/or hopper controller 546, under supervision of processor 502, to determine the face denomination and/or value of the tokens inserted into and discharged from the slot machine 204. The token read/write devices 550 may also send instructions to the tokens or to the controller 202 to change the value and/or status of the tokens.

Figure 6:
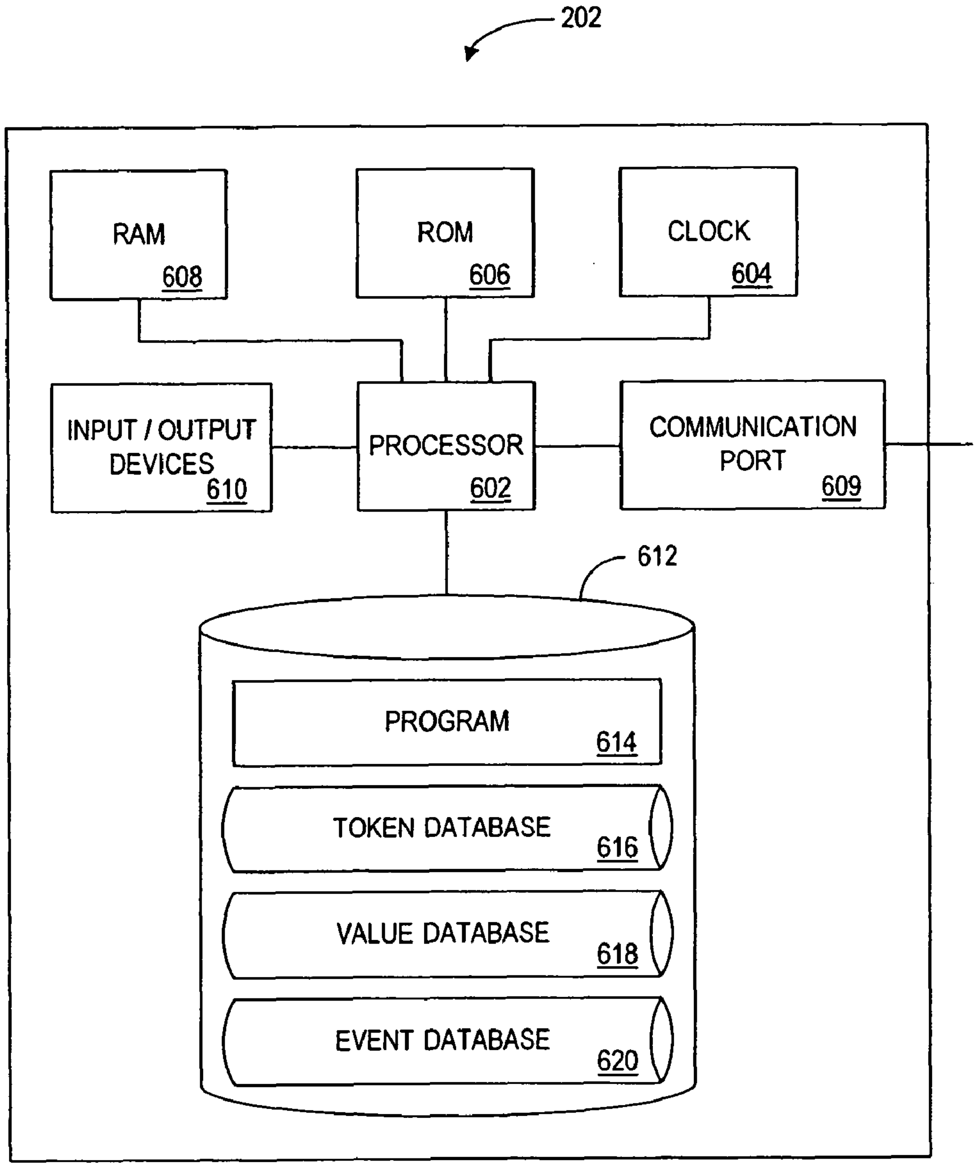
FIG. 6 is a block diagram illustration of a central controller that is part of the system of FIG. 2.

FIG. 6 is a block diagram illustration of the central controller 202. The central controller 202 may be implemented by conventional computer hardware such as a personal computer, mini computer, mainframe computer or server computer. Preferably the central controller 202 includes conventional computer components such as processor 602, connected with clock 604, ROM 606, RAM 608, communications port 609, input/output devices 610 and data storage device 612. All of the components shown as being connected to processor 602 may also be conventional items. The communication port 609 may include, for example, one or more modems to support data communications between the processor 602 and the slot machines and event devices that constitute other components of the system 200. The data storage device 612 may be a hard disk or other suitable storage device.

The data storage device 612 stores a program 614, a token database 616, a value database 618, and an event database 620. The program 614 controls the processor 602 in accordance with the invention such that the central controller 202 manages and oversees operations of the system 200. The processes performed and managed by the central controller 202 will be described in further detail below. The program 614 may also include instructions for carrying out other functions, including an operating system and device drivers as well as communications software. Furthermore, the central controller 202 may perform functions in addition to token management. These functions may include, for example, player tracking and player information storage functions. The token database 616, value database 618 and event database 620 will be described below.

Figure 7:
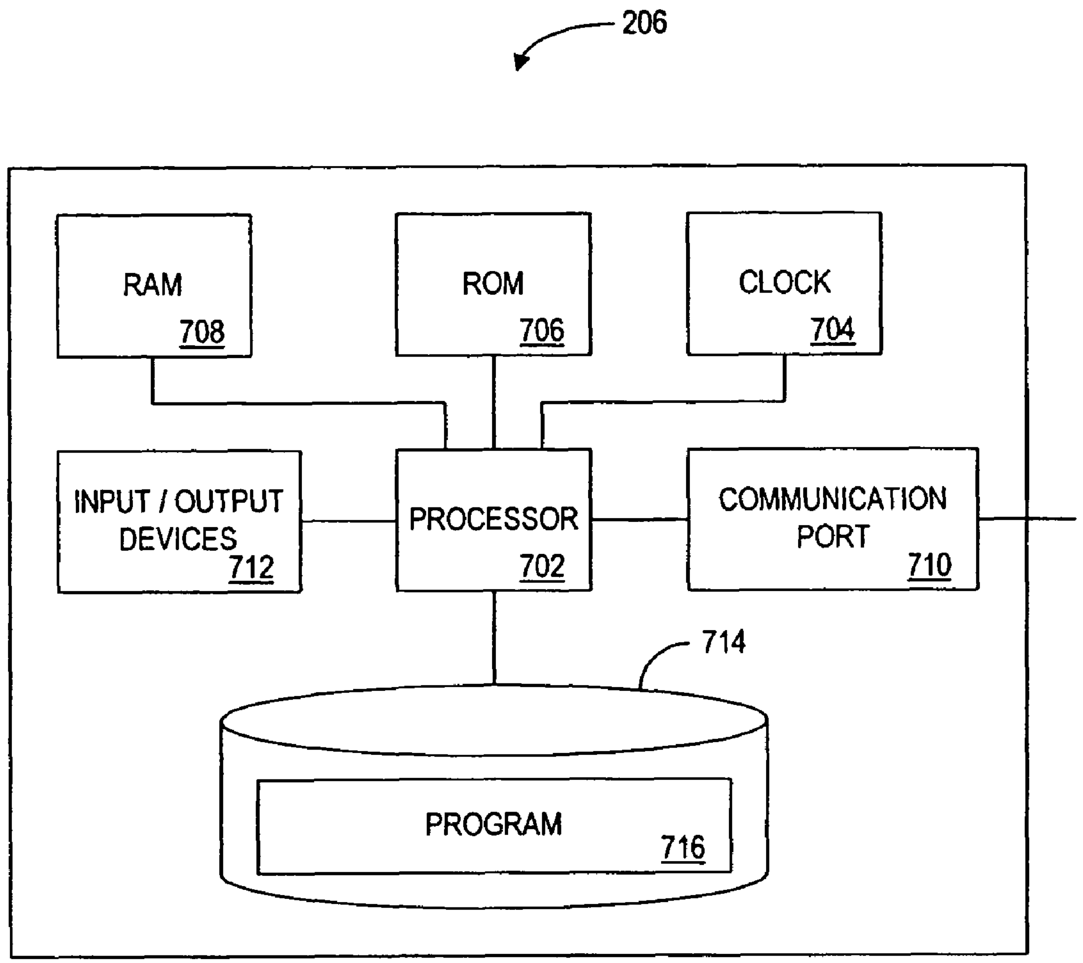
FIG. 7 is a block diagram illustration of an event device that is part of the system of FIG. 2.

FIG. 7 is a block diagram illustration of an event device 206 that is provided to detect and/or register events related to the tokens 208. As seen from FIG. 7 the overall architecture of the event device 206 may be that of a conventional microprocessor-based system, including conventional components such as a processor 702, clock 704, ROM 706, RAM 708, communications port 710, input/output devices 712 and data storage device 714. Stored in the data storage device 714 is a program 716 for controlling the processor 702 and hence the event device 206. The communication port 710 handles data communication between the processor 702 and the central controller 202 (FIG. 2). Continuing to refer to FIG. 7, the input/output devices 712 include one or more devices for providing wireless communication with tokens 208 brought into proximity of the event device 206. Such devices for communicating with the tokens may include conventional devices used to interact with article identification and tracking transponders. For example, the event device 206 (as well as the slot machine 204) may utilize conventional RFID technology with a suitable transponder being included in each of the tokens 208.

Where a "one-bit" variable-value gaming token is used, as discussed above, the event device may be replaced with a much simpler device for changing the value of a token. Depending on the make-up of the gaming token, a simple permanent magnet, or an operator-actuated electro-magnet, may be used by a dealer or a cashier employee to change the status of a gaming token so as to indicate an enhanced value. A suitable degaussing device may be used to reverse the status of the gaming token.

FIG. 8 shows a table 800 that illustrates the token database 616 stored in the central controller 202. The table 800 has columns 802 and 804, which respectively correspond to token identifier entries and value number entries. In each row of the table 800, there is a first field under column 802 which contains a token identifier that uniquely identifies a particular one of the tokens 208. Also in the row is a second field in which there is a number that corresponds to the value currently associated with the token identified in the first field of the row. Although five-digit numbers are shown in column 802, it is contemplated to use numbers having a larger number of digits, so that a larger number of tokens may be uniquely identified. The meaning of the value numbers stored under column 804 will be explained in connection with the value database to be described immediately below. Although only three entries are shown in the Table 800 of FIG. 8, it is contemplated to include a much larger number of entries, and particularly one entry for each of the tokens 208 employed in a particular casino. As noted before the number of tokens may be in the thousands or even upwards of one million.

FIG. 9 shows a table 900 that is an illustration of the value database 618 of FIG. 6. Continuing to refer to FIG. 9, the table 900 includes columns 902 and 904, which respectively store value numbers and corresponding values. That is, in each entry in the table 900 the first field, under column 902, stores a number by which a respective token value is indexed, and in the second field for the entry the currently applicable value for the corresponding token is stored. Thus, value number 1 corresponds simply to a token value of $5.00. Similarly, value number 2 corresponds to a token value of $7.00. Value number 3 indicates that each token assigned this value number is to be accorded a value equal to the face value of the token plus $3.00. Value number 4 indicates that tokens assigned this value number are to be accorded a value that declines over a period of time from an initial value of $5.00 down to a final value of $3.00. It is noted that the time period begins with the occurrence of an event such as the payment of the token to a particular player.

Although not indicated in the particular examples of values recited in FIG. 9, it is also contemplated that tokens may be accorded different values for different purposes. Thus, a token may be accorded its face value for the purpose of redeeming the token for cash, but may be accorded a higher value if inserted into a slot machine. Such an arrangement would tend to give the player an incentive to use the token for slot machine play. The higher value accorded the token for slot machine play may decrease over time, to give the player an incentive to begin playing the slot machine promptly after the event which caused the token to acquire the higher value.

Although only four different values are listed in the table of FIG. 9, it is contemplated that a smaller or much larger number of different values may be assigned to various ones of the tokens 208 to be used in a given casino.

Moreover, although token database 616 and value database 618 have been separately illustrated, it will be recognized that these two databases can be combined in one, by substituting for the value number entries in the table of FIG. 8, the corresponding value entries from the table of FIG. 9.

FIG. 9A shows a table 950 that illustrates a token status database that may be stored in the central controller in addition to or instead of the databases shown in FIG. 6. Continuing to refer to FIG. 9A, the table 950 has a column 952 for storing token identifiers for respective tokens, a column 954 for storing indications of the status of the respective tokens, and a column 956 for storing information as to the benefits associated with the status of each token. The various statuses shown in column 954 may be represented by respective displays provided by the tokens, such as displays of colors that conform to the statuses. Alternatively, the display on the respective token may include an alphanumeric indication of the token status, such as “bronze”, “silver”, “gold”, “platinum”.

FIG. 10 shows a table 1000 that illustrates the event database 620 of FIG. 6. Continuing to refer to FIG. 10, the table 1000 has columns 1002 and 1004, for respectively setting forth events that trigger a change in value, and the corresponding value number representing a value to be associated with a token upon the occurrence of the event. For example, in an entry 1006, an event is stated as a token having been inserted into a slot machine. It will be recognized that this may be detected by a token read/write device of a slot machine present at the token intake of the slot machine.

At 1008 of table 1000 an event is stated as a player having undertaken 1,000 play cycles of a slot machine within a two hour period. Such an event may be detected by conventional player tracking software maintained in either or both of a slot machine 204 or the central controller 202.

An event stated at 1010 is that a player has been playing blackjack for a period of one hour. Such an event may also be detected by player tracking equipment installed at a blackjack table and arranged to read a player card. In this case, the player tracking device may function as an event device and may be arranged to increase the value of a token that is in the possession of the player.

Stated at 1012 is another event, in which a player has entered a high stakes poker room. This event may be detected by conventional player card reading equipment and/or by a token detector which determines that one or more tokens have been brought into the high stakes poker room by a player.

At the next entry, indicated at 1014, the event stated is that a token has been discharged from a slot machine. Such an event may be detected by a token read/write device provided at the hopper of a slot machine.

Although the event database 620 has been illustrated as being resident on the central controller 2002, it should be noted that instead, or in addition, portions or all of the event database 620 may also be stored in individual ones of the slot machines and event devices that make up this system. Thus it is contemplated by the invention that updating of token values in response to events may occur solely at the direction of the central controller 202 in response to data indicative of events received from other components of the system 200. Alternatively, some or all updating of token values may occur at the direction of system components such as slot machines and event devices. The resulting updating of token value is then preferably stored in the token database 616 of the controller 202. However, it is also contemplated that the token value be stored additionally or exclusively in the value store 414 (FIG. 4) of each token 208.

Figure 11:
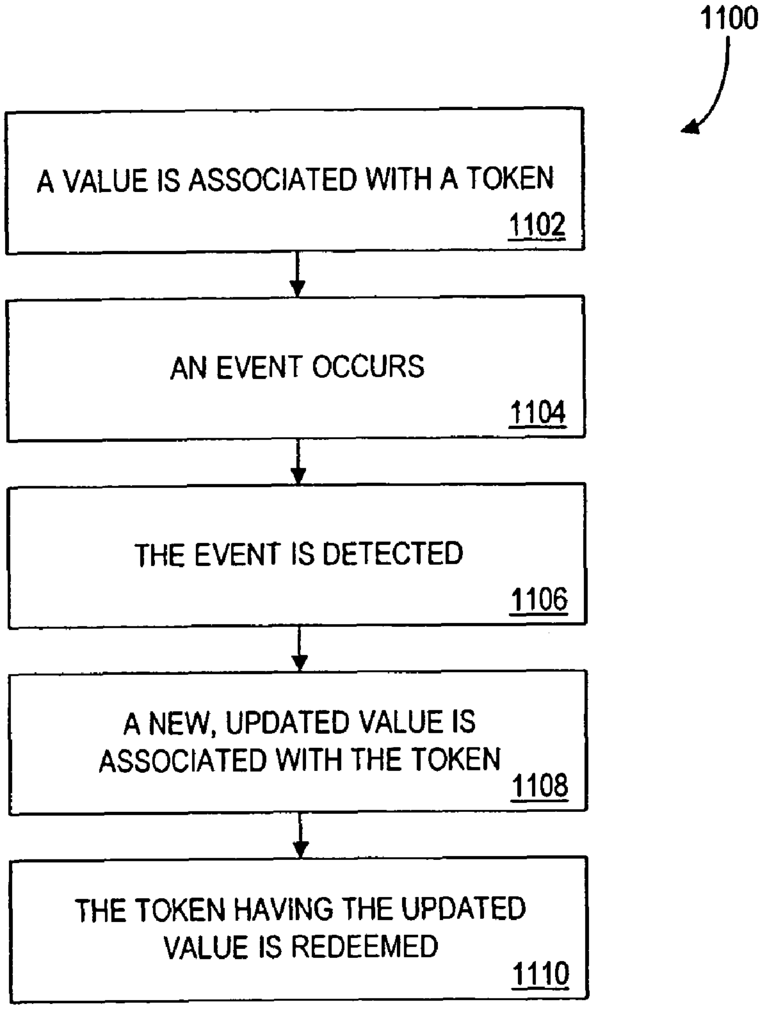
FIG. 11 is a flowchart that illustrates a process carried out in accordance with the invention.

FIG. 11 illustrates a process 1100 which in general terms sets forth a cycle in which a token has its value updated as a result of an event, and then the token is redeemed for the updated value.

According to a first step 1102 in the process 1100, an initial value is associated with a token. In many cases, the initial value is simply the face value of the token. Thus, a $5.00 token may initially have a $5.00 value associated therewith. The association of the value with the token may be documented in either or both of two ways that have been discussed above; namely storing an appropriate entry in the token database of the central controller 202 and/or storing the token value in the value store of the token itself. If the token value is stored in both the token memory and in the central controller token database, then the token database may serve as a backup or confirmation for the value data stored in the token memory.

If the token in question has a display, then the display may indicate that the token is at face value. Alternatively, when the token is at face value, the display may be maintained in a blank state. Similarly, if the token has an audio device, the audio device may be disabled from emitting any sound when the token is at face value.

Following step 1102 is step 1104. At step 1104 an event occurs that is relevant to the value of the token. Such events may be of many different kinds. For example, an event may be related to an interaction between a token and a slot machine. Examples of such events are a token being inserted a slot machine and a token being discharged from a slot machine. Another event may occur if a token is retained in a slot machine for a certain period of time.

Other events may involve interaction of a player with a slot machine. For example, an event may be considered to have occurred if a player has initiated a certain number of play cycles of the slot machine. Alternatively, an event may be deemed to have occurred if the player has been playing a slot machine for a predetermined period of time. Moreover, an event may be based upon a number of play cycles and a period of time, for example 100 play cycles within a period of 20 minutes. As another example, an event may be deemed to have occurred when a player has lost a predetermined amount of money. As still another example, in the context of a video poker machine, an event may be deemed to have occurred if a player has achieved a certain rank of hand a certain number of times within a predetermined period of time.

There may also be events that arise from player activities that are unrelated to slot machines. Thus, an event may be deemed to have occurred upon a player's entering or leaving a particular room, or joining in or leaving play at a certain gaming table.

Events may also be deemed to have occurred without activity on the part of the player or any interaction with a slot machine. For example, an event may be deemed to have occurred upon the expiration of a predetermined period of time after another event. Alternatively, an event may be deemed to have occurred upon the occurrence of a pre-determined point in time.

Another type of event that may occur is that a token is issued to a player by a cashier of the casino, or is cashed in by the player.

Step 1106 follows step 1104. At step 1106 the event referred to in step 1104 is detected. When the event entails interaction of a token with a slot machine, the detection of the event may be via a token read/write device 550 (FIG. 5), as previously discussed. When the event involves a player interaction with a slot machine, the detection of the event may be via player tracking equipment included in the slot machine and in the system 200, as noted above. Similarly, player tracking equipment may also be used to detect events related to player participation in table games. Events related to token transactions with a cashier may be registered by the cashier personnel and/or may be detected by event devices installed at the cashier location.

After step 1106 is step 1108, at which an updated value is associated with the token in response to detection of the event. The appropriate updated value is determined by referring to the event database 620 (FIG. 6). This may be done by the device that detects the event, if the event database is stored therein. If the event database is only present in the central controller 202, then the device that detects the event communicates with the central controller, and based on the communication the central controller determines the appropriate updated value for the token in question. The central controller may then transmit the appropriate updated value to the device that detected the event, so that device causes the token to store the updated value. In addition or alternatively, the central controller itself may update the corresponding entry in the token database. Assuming that the token includes a display device and/or an audio device, then the token may provide an updated display and/or may provide audio output to indicate the new, updated value of the token.

Following step 1108 is step 1110. In step 1110 the token which has the updated value is redeemed. Redemption may occur in a number of ways. For example, the token may be redeemed by being inserted into a slot machine which credits the player with a number of play credits equivalent to the updated value of the token. In this case, it will be understood that the slot machine has read the value from the token via the token read/write device 550 referred to above. Alternatively, the read/write device may be employed to read the token identifier and then, using the token identifier, the slot machine queries the central controller as to the value currently associated with the token. Based on the response from the central controller, the slot machine provides an appropriate amount of credit to the player, corresponding to the currently associated value of the token as reported by the central controller.

The token may also be redeemed by being cashed in at a cashier facility. In this case the token value may be read from the token display by a cashier employee. Alternatively, a read/write device may be provided to read the token value directly from the token via wireless communication. As another alternative, the token identifier may be read by the read/write device which then queries the central controller to receive a response indicative of the currently associated value for the token.

A token may also be redeemed at a snack bar, souvenir shop or other facility associated with the casino by being used to pay for goods or services. The currently associated value of the token may be determined in these cases in the same manner by which it was determined in the cashier example stated above.

* * *

There will now be described examples of promotional programs that may be implemented by a casino using the methods and apparatus of the present invention. The examples listed herein do not necessarily constitute an exhaustive list of all possible embodiments and do not necessarily require the above-described hardware.

Example 1

Some or all tokens discharged from a slot machine are assigned an augmented value upon the event of being discharged from the slot machine as a payout to a player. The augmented value is applicable only when the tokens are inserted in the slot machine from which they were discharged or inserted into another slot machine. The augmented value may be assigned such that the augmented value decreases over a period of time or is eliminated upon the expiration of a period of time. With a promotional program of this sort, players are given an incentive to use discharged tokens to continue playing the slot machine. If the augmented value decreases or is extinguished over time, then the incentive is to resume play immediately or within a short time.

A program of this kind tends to encourage continued playing of slot machines, which enhances the profitability of the casino.

When the token is inserted in the slot machine, the system detects the augmented value and credits the augmented value to the player. This may be done by a token read/write device at the token intake of the slot machine reading from the token the token value stored in the value store of the token. Alternatively, the token/read write device may read the token identifier from the token, and the slot machine may then communicate with the central controller to determine the value currently associated with the token, as stored in the token database of the central controller. At the same time, preferably the augmented value is deducted from the value associated with the token. The removal of the augmented value may occur pursuant to communication from the token read/write device to the processor in the token. The processor in the token then causes the appropriate updated value (say the face value of the token) to be written into the value store of the token. In addition, the slot machine may communicate with the central controller to inform the central controller that the token has been redeemed. The central controller then updates the entry for the token in the token database to indicate that the currently applicable value of the token is the face value. Consequently, the token is effectively redeemed by being inserted in the slot machine and the associated value of the token is reduced to be equal to the face value of the token.

Thus in this example two events occur. These events are discharging of the token from the slot machine, which causes the associated value of the token to be increased, and insertion of the token into the slot machine, which causes the associated value of the token to be reduced to the face value.

Example 2

When a player leaves a gaming table such as a blackjack table after having played a certain number of hands (say 50 hands) or after playing for a certain period of time (say 1 hour) the dealer uses an event device to augment the value of one of the player's tokens. The augmented value may only be realizable by using the token to play a slot machine. As in the previous example, when the token is inserted in a slot machine, a token read/write device at the intake of the slot machine reads and credits the player for the augmented value, and at the same time the token read/write device changes the associated value of the token so that the associated value of the token is reduced to the face value of the token.

As a variation to this example, the dealer may operate the event device to provide the augmented token value only when the player is leaving the gaming table.

A program of this kind rewards players for extended play at a gaming table, while at the same time giving the player an incentive to use remaining tokens for slot machine play. This is advantageous to the casino since slot machines are generally the most profitable game from the point of view of the casino.

The dealer's augmenting the value of the token may occur based on circumstances other than or in addition to the number of hands or the length of time that the player has played the table game. For example, if the table game is crowded and/or if slot machines are unused at a particular point in time, then the dealer may augment token values for use in slot machines in order to encourage players to leave the table game to start playing a slot machine. This may aid in relieving crowding at the card table, while causing unused slot machines to be put into use.

Example 3

Some or all of the tokens discharged by a first slot machine may, upon discharge from the slot machine, be placed in a "bonus" status. A second slot machine, with special characteristics that are advantageous for the player, is provided. The second slot machine can only be played with tokens that have the bonus status. For example, the second slot machine may have an especially high payout, or may be arranged, on average, to pay out a higher ratio of the amount wagered than standard slot machines.

A promotional program of this type encourages players to play the first slot machine in order to earn the privilege of playing the second slot machine using bonus tokens discharged from the first slot machine.

To prevent immediate cash outs from the first slot machine, the bonus tokens may be discharged only after a certain period of time that the player has played the first slot machine, or only after a certain number of play cycles by a given player, or the bonus tokens may only be discharged to reflect winning results from the first slot machine.

Example 4

A bingo game card is issued to some or all players at a casino. Tokens discharged from slot machines are caused to display suitable numbers so that the tokens may be used as game pieces with the bingo cards.

As in the previous example, to deter players from immediately cashing out credits at slot machines, the tokens are caused to display bingo game numbers only if discharged from the slot machine after the player has been playing for a predetermined period of time, or has played a certain number of play cycles; or alternatively only tokens which represent credits earned from winning play cycles are caused to display bingo game numbers.

Suitable prizes may be awarded for having game pieces that match a row, column or diagonal of the player's bingo game card.

In this promotional program, the bingo game is a secondary game relative to the slot machine play. This program makes use of the display feature of the gaming token disclosed herein, and does not require a change in the value of the token.

This promotional program adds to the interest and entertainment value of slot machines and provides incentives for players to increase or continue their playing of slot machines.

Example 5

Some or all tokens discharged from slot machines are caused to display randomly-generated nine digit numbers. An announcement is made at the casino that any person who turns in a token that displays a number that matches the person's social security number wins a large prize such as a million dollars.

Again, this promotional program encourages playing of slot machines. Preferably the same precautions against immediate cashouts are taken as in the two previous examples.

In effect this promotional program implements a "lucky token" drawing.

Example 6

Another "lucky token" drawing game may be implemented as follows.

An announcement is made at the casino that one token discharged from a slot machine within the next half hour (in regard to credits accrued from winning a play at the slot machine) will display a special indicia such as "grand prize". A prize such as a car will be awarded to the player who turns in the token which displays "grand prize".

As a variation on this program, whether a token is the winning token or not can be determined only by inserting the token into a slot machine and betting the credit awarded for the token. The slot machine reads the token and determines, based on the token identifier for the token, whether it is the prize winning token. The slot machine then provides a suitable display if the winning token is read. It is to be noted that for this variation the token need not have a display. Indeed, the token only needs to bear its token identifier in some machine readable form, which may be an optically scannable form. In the latter case there is no need to provide a memory in the token for storing the token identifier.

Example 7

In this promotion an enhanced value may be transferred from one token to another. A token having an enhanced value is inserted in a slot machine. A credit reflecting the enhanced value is generated in the slot machine. The credit is used for one or more play cycles, which results in a winning outcome. A token discharged from the machine to pay off the winning outcome has the enhanced value from the first token plus a further enhanced value. This token may then be inserted in the machine to attempt to win a token with a still further enhanced value. Each time a token is inserted in the machine its enhanced value is wiped out from the inserted token.

This promotion also provides incentives for more and continued playing of slot machines.

Example 8

This promotion requires only that the tokens carry machine readable identifiers and that the slot machines be arranged to read the token identifiers from the tokens. The tokens need not be capable of displaying the respective identifier, nor does the reading of the token have to be via wireless communication between the slot machine and the token.

In this example all tokens are randomly assigned to sets of three tokens. If all three tokens in a particular set are used to bet on the same play cycle in a single slot machine, then a large prize, such as a million dollars, is awarded.

Again, this promotion provides an incentive for more playing of slot machines.

Example 9

When a token having a "bonus" status is inserted in a slot machine, the slot machine detects the bonus status and implements a probability table and/or a payout table that is more favorable to the player than standard tables used in other slot machines.

Example 10

When a token has a "bonus" status, an individual who possesses the token may be allowed to take advantage of special deals at shops and/or restaurants of the casino.

Example 11

A token that was just inserted in a slot machine has its value increased if the next play cycle of the slot machine results in a certain reel position or combination of reel positions.

There will now be described another embodiment of the invention. In this embodiment, instead of assigning variable values to actual tokens, variable values or statuses are assigned to "virtual tokens" displayed by a slot machine used in other slot machines.

Figure 12:
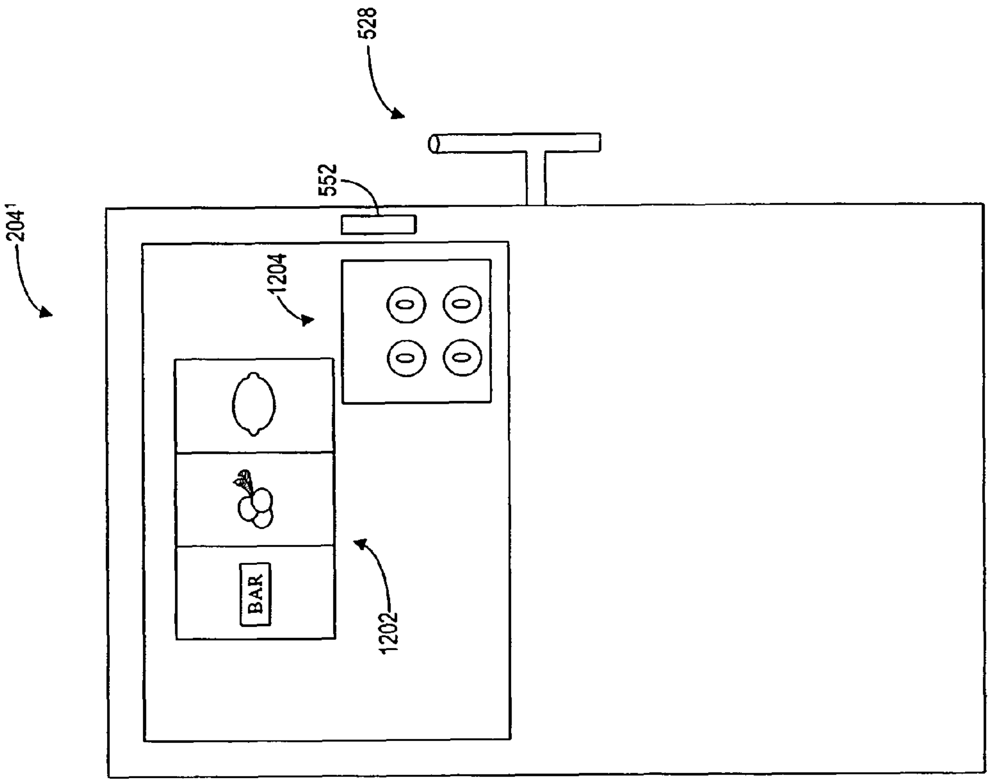
FIG. 12 is a schematic front view of another embodiment of a slot machine provided in accordance with the invention.

FIG. 12 is a front view of a slot machine 204' which has been modified in accordance with this embodiment of the invention. The slot machine 204' of FIG. 12 need not have the token read/write capability of the slot machine embodiment described in connection with FIG. 5. Otherwise, the slot machine 204' may include the same components as the slot machine 204 of FIG. 5. As shown in FIG. 12, the slot machine 204' includes reels 1202 and a touch screen 1204.

Figure 13:
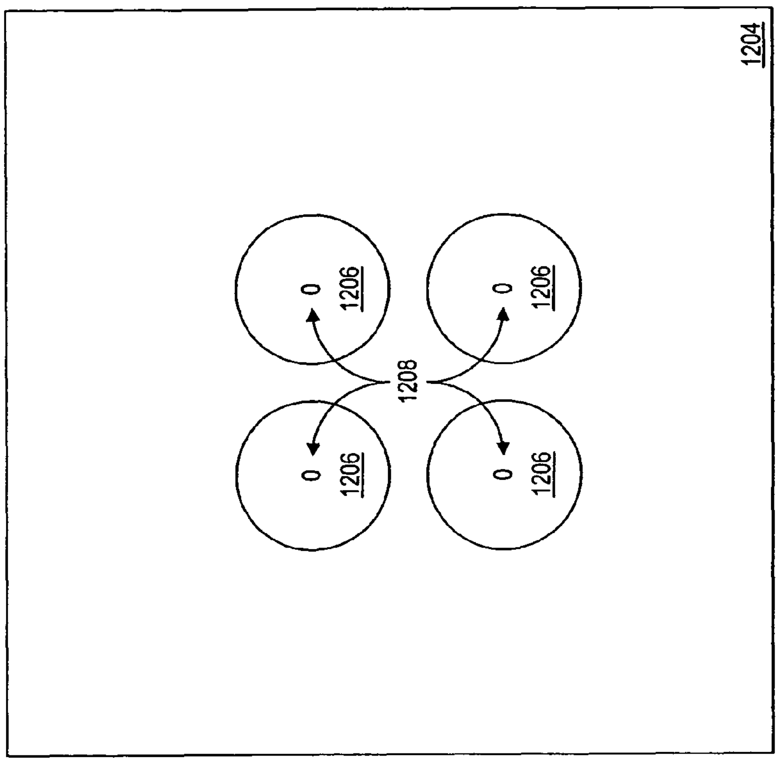
FIGS. 13-22 are screen displays provided by the slot machine of FIG. 12 as virtual tokens are used, won or lost during a sequence of play cycles of the slot machine.

FIG. 13 is a magnified representation of the touch screen 1204 and the image displayed on the touch screen. Displayed on the touch screen 1204 are virtual tokens 1206. Each virtual token 1206 represents a credit available to the player for use in wagering in the slot machine 204'. A use number indicated at 1208 is assigned to each of the virtual tokens 1206. The use number is indicative of the number of times that the credit represented by the virtual token 1206 has been used for wagering in the slot machine 204'.

Figure 14:
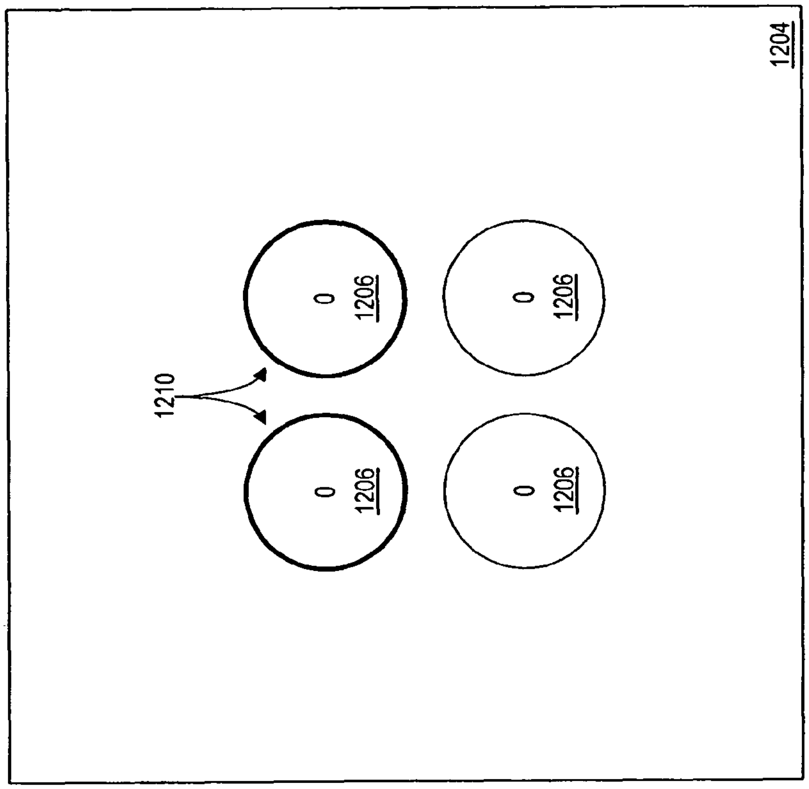
Figure 15:
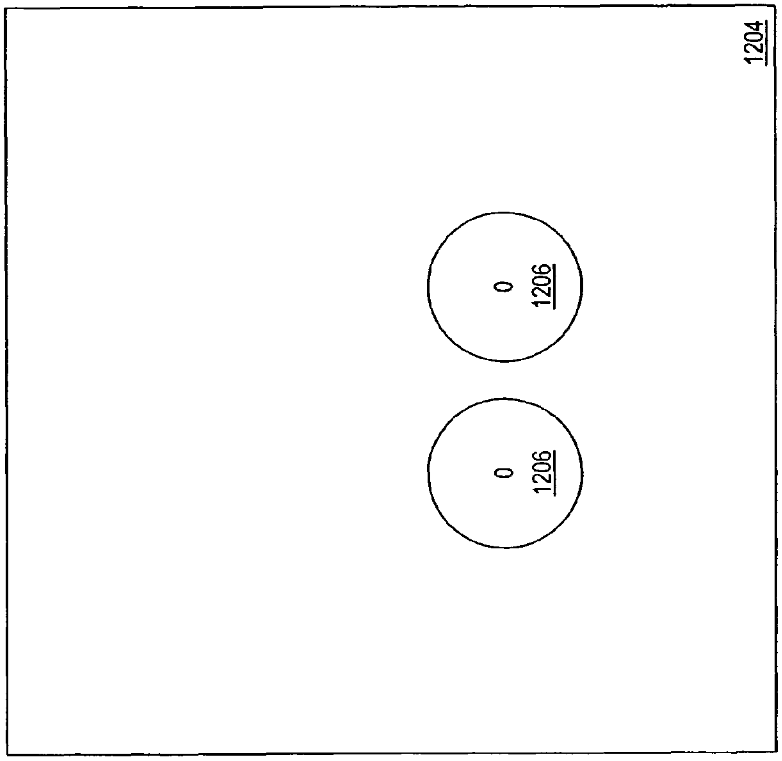

The "0" use number associated with each of the virtual tokens shown in FIG. 13 indicates that the credits represented by those tokens have not yet been used for wagering. For example, the corresponding credits may just have been generated in response to currency or tokens inserted in the slot machine. Credits corresponding to particular ones of the virtual tokens may be selected for use as a wager in the next play cycle of the slot machine by the player touching the touch screen at the point where the virtual tokens are displayed. For example, if the player touches the touch screen at the place where the two upper virtual tokens 1206 are displayed, then the corresponding credits are selected for wagering in the next play cycle, and the selection and identification of these two virtual tokens for use in the next cycle is indicated by displaying the virtual tokens in a bold manner, as indicated at 1210 in FIG. 14. If a play cycle results in a losing outcome, then the corresponding virtual tokens selected for use as wagers in that play cycle are removed from the display. It is assumed that the two selected virtual tokens illustrated in bold in FIG. 14 were wagered on a losing play cycle and therefore are removed from the display, resulting in the display shown in FIG. 15.

Figure 16:
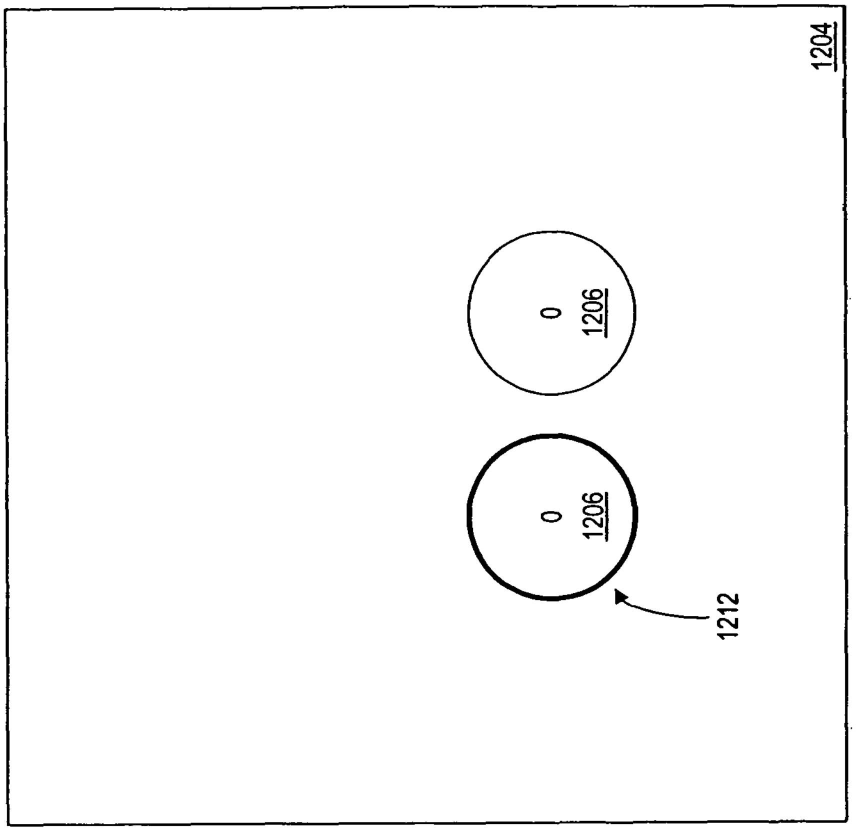
Figure 17:
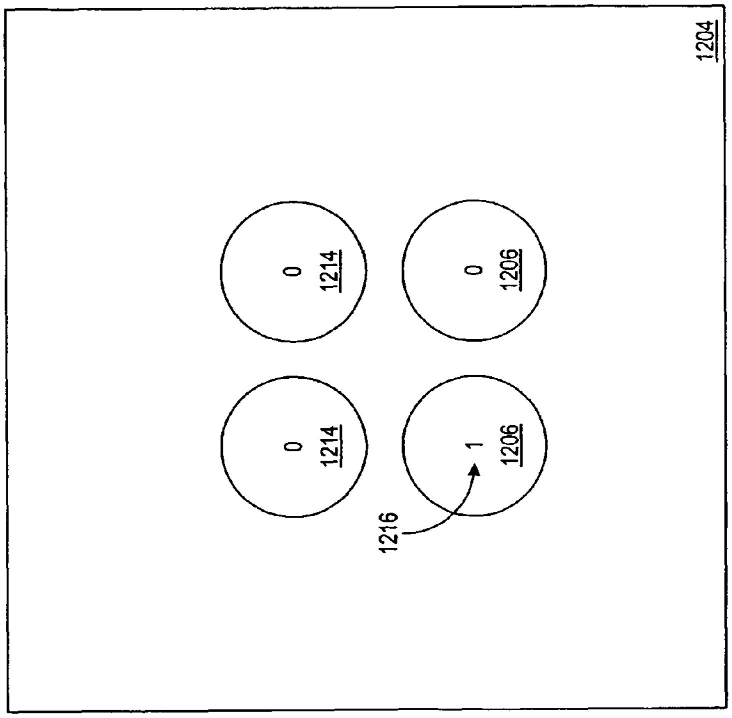

It is next assumed that the player touches the touch screen 1204 at the place where the left-hand one of the remaining two virtual tokens is displayed, thereby selecting that virtual token for use as a wager on the next play cycle. The resulting screen display is shown in FIG. 16, with the left-hand remaining virtual token displayed in bold, as indicated at 1212. It is now assumed that the play cycle upon which that virtual token is wagered results in a winning outcome and that the payout for the winning outcome is two additional credits. The resulting display is shown in FIG. 17. It will be observed that two new, unused virtual tokens 1214 are added to the display, to represent the new credits won in the winning play cycle. In addition, as indicated at 1216, the use number for the successfully wagered token 1206 has been updated to indicate that the virtual token in question has been successfully used one time.

Figure 18:
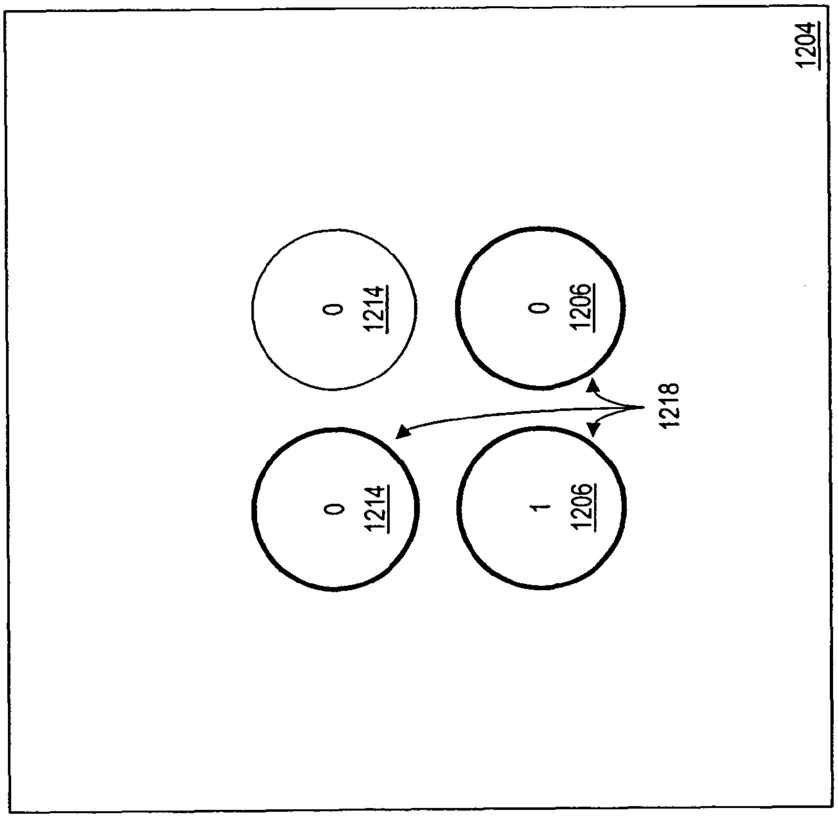

Let it next be assumed that the player selects three of the virtual tokens for wagering on the next play cycle. Further assume that the three tokens selected for wagering are the once-used token, the other "old" virtual token and the left-hand one of the two newly-earned virtual tokens. The resulting screen display is shown in FIG. 18. As before, the virtual tokens selected for wagering are displayed in bold, as indicated at 1218.

Figure 19:
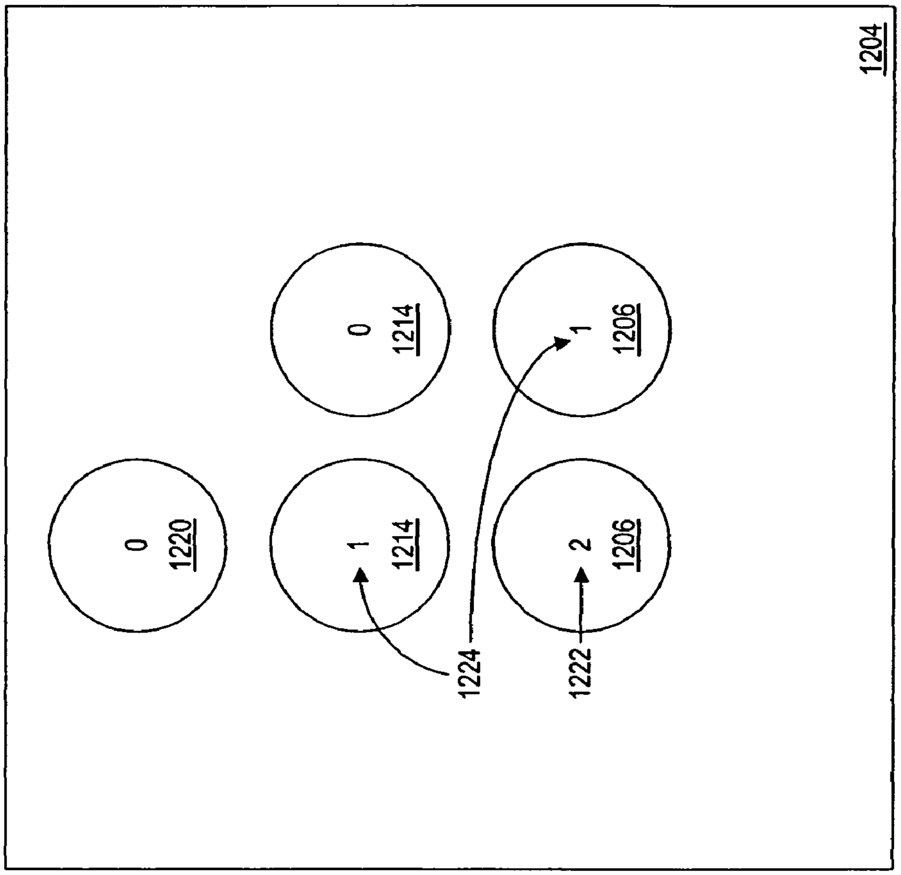

It is now assumed that the play cycle on which these three virtual tokens are wagered is successful, and results in a payout of one additional credit. The resulting screen display is shown in FIG. 19. The new virtual token labeled 1220 represents the credit won in the latest play cycle. In addition, the use numbers for the three virtual tokens that were wagered are updated. In particular, the virtual token that was successfully wagered twice is assigned a use number of "2", as indicated at 1222. The two virtual tokens that were just wagered successfully for the first time are assigned use numbers of "1", as indicated at 1224.

Figure 20:
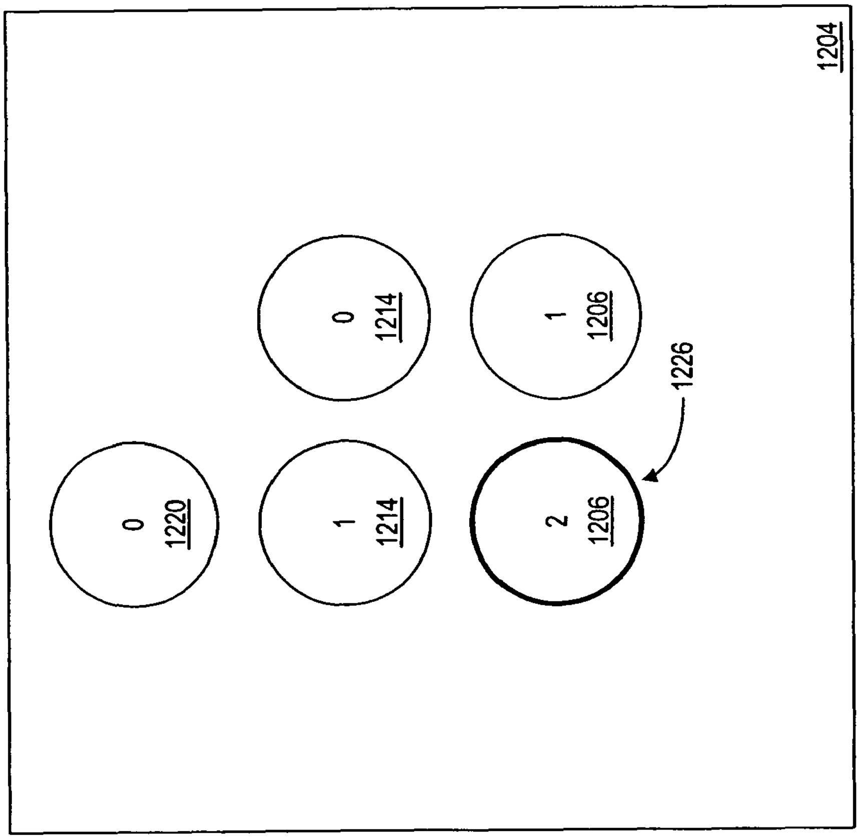
Figure 21:
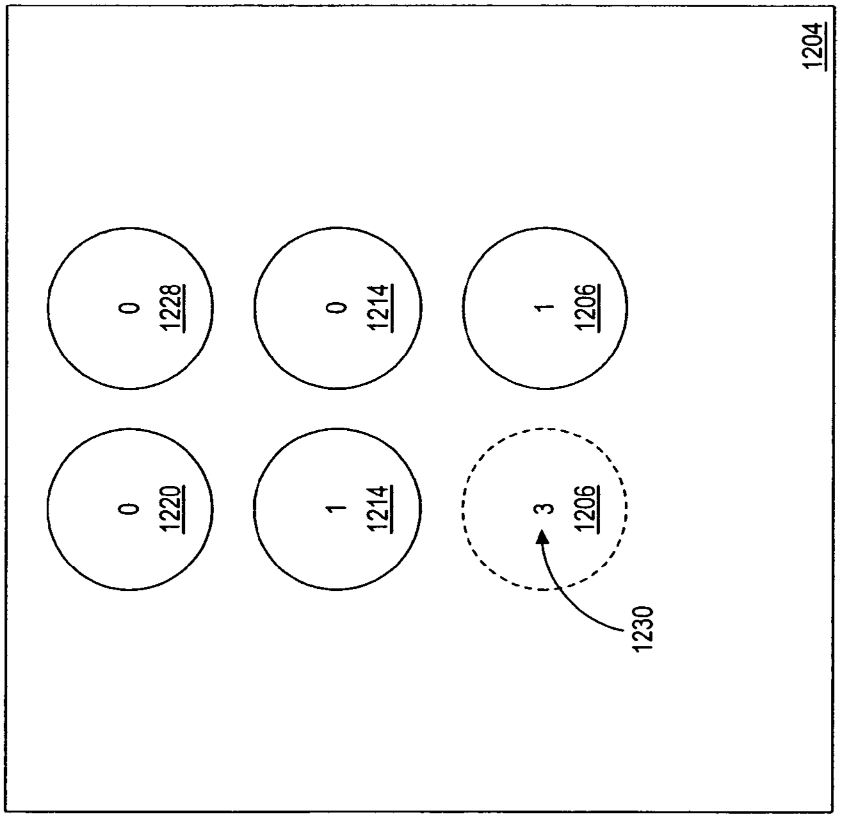
Figure 22:
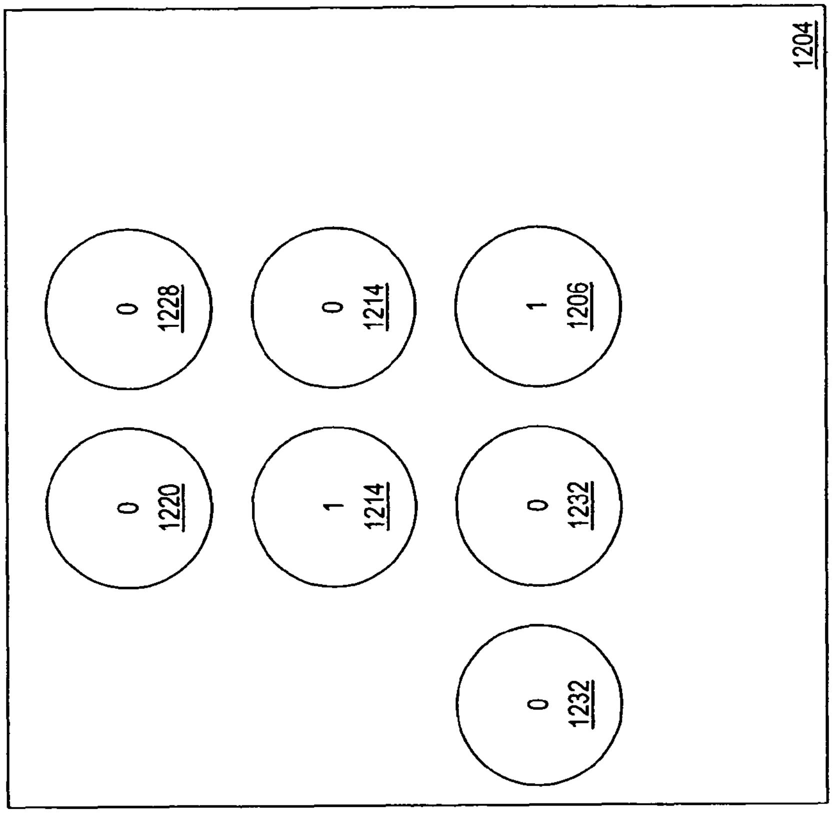

For the next play cycle it is assumed that only the virtual token which has been used twice before is selected for wagering. The resulting screen display is shown in FIG. 20. As seen at 1226, the virtual token selected for wagering is again displayed in bold. It is now assumed that the next play cycle also results in a winning outcome and that one additional credit is paid out. The resulting screen display is shown in FIG. 21. It will be noted that the new credit won at the last play cycle is represented by a new virtual token 1228. Also, as indicated at 1230, the use number for the wagered virtual token is again updated, this time to indicate that the virtual token in question has been wagered successfully three times. At this point, the player is provided a special benefit for having achieved the feat of successfully wagering the token three times. According to this benefit, an additional credit is provided. This is shown in the display by the thrice-used virtual token being represented as a dashed line in FIG. 21, and then being replaced by two unused virtual tokens 1232, as shown in the screen display of FIG. 22. In this case, when a threshold of three successful wagers is achieved, the corresponding virtual token is split to provide two new, unused virtual tokens.

To summarize, the player has been awarded an additional credit for successfully betting the same virtual token three times. This embodiment of the invention accordingly provides an incentive to the player to continue wagering virtual tokens that have previously been wagered successfully. This tends to encourage further play and adds additional interest and entertainment value to the slot machine.

It is to be understood that the number of successful wagers of a single virtual token required to receive the additional credit may be more or less than the threshold of three indicated above. Also the number of additional credits awarded may be more than one.

In the present example, varying statuses of the virtual tokens, such as selected for betting or due to be exchanged for an incentive award, have been indicated by bold or dashed lines. Other representations are possible, including by various colors, or by flashing the corresponding portion of the display, or displaying in negative (white on black) to indicate variations in status of the virtual tokens. It is also contemplated to replace the numerals representing use numbers with other representations, such as colors. For example, the use numbers 1, 2, 3 may be respectively represented by bronze, silver, gold colors.

This embodiment and others have referred to slot machines and have referred to reels of the slot machines, but it should be understood that in virtually all cases the embodiments described herein are also equally applicable to other types of gaming devices, including video poker devices.

In many examples referred to above, gaming tokens have been caused to change from one status to another. In general it is contemplated to provide gaming tokens that may be capable of having two or more statuses For example, gaming tokens according to the invention may be switchable among three or more different values.

In embodiments of the invention as described above, there have been databases that store the currently applicable value or status of the gaming tokens. It is also contemplated to provide a database that stores a record of events that have occurred in regard to gaming tokens. For example, such a database may record that a given token has been inserted into and discharged from a slot machine a certain number of times. This information might be used as part of a promotional scheme that accords special value to a token that has been cycled through a slot machine a certain number of times. This type of promotion would give players an incentive to continue playing a slot machine.

Embodiments of the invention as described above have been concerned with applications of the invention to gaming casinos. However, it is also contemplated to apply aspects of the invention to tokens used in game arcades. For example, the display feature of the inventive gaming token may be used in an arcade to support secondary games (that may be like the secondary games of Examples 4-6) to give players incentives for continued playing of games at the arcade.

In the above-described embodiments a token may indicate its status by a suitable visible or audible signal. Alternatively, the status of the token may be indicated by a tactilely detectable signal such as a vibration.

Although the present invention has been described with respect to preferred embodiments thereof, those skilled in the art will note that various substitutions, modifications and variations may be made with respect to the embodiments described herein without departing from the spirit and scope of the present invention.

What is claimed is:

1. A method of operating a gaming device, the method comprising:

receiving a payment from a player;

generating a monetary credit value corresponding to the received payment;

causing at least one display device to display the monetary credit value as a displayed set of at least one virtual token;

causing at least one processor to execute a plurality of instructions to associate a use number with each virtual token, the use number associated with each virtual token being:

(i) associated with a number of times said virtual token has been bet in a play of a game without being lost, and (ii) distinct from any monetary credit value currently associated with said virtual token;

identifying at least one virtual token for betting;

causing the at least one processor to execute the plurality of instructions to determine a play outcome; and on the basis of the play outcome:

(i) causing the at least one processor to execute the plurality of instructions to update the set of at least one virtual token, and (ii) causing the at least one display device to display the updated set of at least one virtual token.

2. The method of claim 1, wherein the receiving includes receiving currency inserted into the gaming device.

3. The method of claim 1, wherein the receiving includes receiving at least one gaming token inserted into the gaming device.

4. The method of claim 1, wherein the receiving includes receiving a transfer by a payment card.

5. The method of claim 1, which includes causing the at least one processor to execute the plurality of instructions to add at least one virtual token to the set of at least one virtual token if the play outcome indicates a win.

6. The method of claim 1, which includes causing the at least one processor to execute the plurality of instructions to incrementing the use number associated with the identified virtual token if the play outcome indicates a win.

7. The method of claim 1, which includes causing the at least one processor to execute the plurality of instructions to remove the identified virtual token if the play outcome indicates a loss.

8. The method of claim 1, wherein zero is the use number associated with any of the virtual tokens that has not been identified for betting.

9. The method of claim 1, which includes causing the at least one processor to execute the plurality of instructions to provide a benefit to the player for each virtual token associated with a use number equal to a predetermined threshold.

10. The method of claim 9, wherein the benefit comprises at least one additional virtual token.

11. The method of claim 1, wherein the gaming device comprises at least one of: a slot machine and a video poker machine.

12. The method of claim 1, wherein the play outcome comprises a result of a spinning of slot reels.

13. The method of claim 1, wherein the play outcome comprises a result of a virtual spinning of virtual slot reels.

14. A gaming device, comprising:

a processor; and a memory coupled to the processor, the memory storing a plurality of instructions, that when executed by the processor, cause the processor to operate with at least one display device and at least one input device to:

receive a payment from a player;

generate a monetary credit value corresponding to the received payment;

represent the monetary credit value as a displayed set of at least one virtual token;

associating associate a use number with each virtual token, the use number associated with each virtual token being:

(i) associated with a number of times said virtual token has been bet in a play of a game without being lost, and (ii) distinct from any monetary credit value currently associated with said virtual token;

identify at least one virtual token for betting;

determine a play outcome; and on the basis of the play outcome, update the displayed set of at least one virtual token.

* * * * *

UNITED STATES PATENT AND TRADEMARK OFFICE

CERTIFICATE OF CORRECTION

PATENT NO. : 7,878,896 B2
APPLICATION NO. : 11/321793
DATED : February 1, 2011
INVENTOR(S) : Jorasch et al.

It is certified that error appears in the above-identified patent and that said Letters Patent is hereby corrected as shown below:

In Claim 6, column 21, line 9, replace “incrementing” with --increment--.

In Claim 14, column 22, line 14, delete “associating”.

Signed and Sealed this
Fifth Day of April, 2011

David J. Kappos
*Director of the United States Patent and Trademark Office*